US012700391B2

(12) United States Patent
Zheng et al.

(10) Patent No.: US 12,700,391 B2
(45) Date of Patent: Aug. 4, 2026

(54) ACOUSTIC DEVICES AND METHODS FOR DETERMINING TRANSFER FUNCTIONS THEREOF

(71) Applicant: SHENZHEN SHOKZ CO., LTD., Shenzhen (CN)

(72) Inventors: Jinbo Zheng, Shenzhen (CN); Chengqian Zhang, Shenzhen (CN); Le Xiao, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 318 days.

(21) Appl. No.: 18/508,417

(22) Filed: Nov. 14, 2023

(65) Prior Publication Data

US 2024/0078991 A1 Mar. 7, 2024

Related U.S. Application Data

(63) Continuation of application No. PCT/CN2022/079000, filed on Mar. 3, 2022.

(30) Foreign Application Priority Data

Nov. 19, 2021 (CN) ......................... 202111408329.8

(51) Int. Cl.
*G10K 11/178* (2006.01)
*H04R 1/10* (2006.01)

(52) U.S. Cl.
CPC ..... *G10K 11/17817* (2018.01); *H04R 1/1008* (2013.01); *H04R 1/1083* (2013.01); *H04R 2460/01* (2013.01)

(58) Field of Classification Search
CPC ........................... H04R 1/1008; H04R 1/1083; H04R 2460/01; H04R 2460/09; G10K 11/17817;
(Continued)

(56) References Cited

U.S. PATENT DOCUMENTS 12,302,057 B1 * 5/2025 Chen .................... H04R 1/1016
2012/0057718 A1 * 3/2012 Vernon ............ G10K 11/17885 381/71.6
(Continued)

FOREIGN PATENT DOCUMENTS

CN 108200492 A 6/2018
CN 111935589 A 11/2020
(Continued)

OTHER PUBLICATIONS

The Extended European Search Report in European Application No. 22894118.3 mailed on Sep. 16, 2024, 6 pages.
(Continued)

*Primary Examiner* — Jason R Kurr
(74) *Attorney, Agent, or Firm* — METIS IP LLC

(57) ABSTRACT

The present disclosure discloses an acoustic device and a method for determining a transfer function thereof. The acoustic device includes a sound production unit, a first detector, a processor, and a fixing structure. The sound production unit is configured to generate a first sound signal based on a noise reduction control signal. The first detector is configured to obtain a first residual signal including a residual noise signal formed by superposition of an environmental noise and the first sound signal at a location of the first detector. The processor is configured to estimate a second residual signal at a target spatial location that is closer to the ear canal than the first detector, and update the noise reduction control signal based on the second residual signal. The fixing structure is configured to place the acous-
(Continued)

tic device at a location near a user's ear but not blocking the ear canal.

15 Claims, 4 Drawing Sheets

(58) Field of Classification Search
CPC ....... G10K 11/17813; G10K 11/17821; G10K 11/17857; G10K 11/17875; G10K 11/1781; G10K 2210/1081; G10K 2210/1082; G10K 2210/3038
See application file for complete search history.

(56) References Cited

U.S. PATENT DOCUMENTS

| | | | |
|---|---|---|---|
| 2012/0215519 | A1 | 8/2012 | Park et al. |
| 2014/0044275 | A1 | 2/2014 | Goldstein et al. |
| 2017/0148428 | A1 | 5/2017 | Thuy et al. |
| 2018/0027125 | A1 | 1/2018 | Petri et al. |
| 2018/0091883 | A1 | 3/2018 | Howes et al. |
| 2020/0245057 | A1 | 7/2020 | Igarashi et al. |
| 2021/0044882 | A1 | 2/2021 | Jain et al. |
| 2021/0304725 | A1 | 9/2021 | Kannan et al. |
| 2022/0270583 | A1* | 8/2022 | Fridman ............ G10K 11/1783 |
| 2023/0300516 | A1* | 9/2023 | Betlehem ............ H04R 25/505 381/71.6 |

FOREIGN PATENT DOCUMENTS

| | | | |
|---|---|---|---|
| CN | 112053698 | A | 12/2020 |
| CN | 112637724 | A | 4/2021 |
| CN | 112992114 | A | 6/2021 |
| CN | 113421540 | A | 9/2021 |
| EP | 3644307 | A1 | 4/2020 |
| JP | 2012247738 | A | 12/2012 |
| WO | 2021063692 | A1 | 4/2021 |

OTHER PUBLICATIONS

Notice of Preliminary Rejection in Korean Application No. 10-2023-7044934 mailed on Jan. 31, 2025, 8 pages.

International Search Report in PCT/CN2022/079000 mailed on Aug. 17, 2022, 8 pages.

Written Opinion in PCT/CN2022/079000 mailed on Aug. 17, 2022, 8 pages.

* cited by examiner

ACOUSTIC DEVICES AND METHODS FOR DETERMINING TRANSFER FUNCTIONS THEREOF

CROSS REFERENCE TO RELATED APPLICATION

This application is a continuation of International Patent Application No. PCT/CN2022/079000, filed on Mar. 3, 2022, which claims priority to Chinese Patent Application No. 202111408329.8, filed on Nov. 19, 2021, the entire contents of each of which are incorporated herein by reference.

TECHNICAL FIELD

The present disclosure relates to the field of acoustic technology, and in particular, to an acoustic device and a method for determining a transfer function thereof.

BACKGROUND

When a traditional headphone is working, a feedback microphone used for active noise reduction and a target spatial location (such as a position where a tympanic membrane is located) may be considered to be in a sound pressure field. The sound pressure distribution at different locations in the sound pressure field is uniform. Therefore, a signal picked up by the feedback microphone may directly reflect the sound heard by the user's ears. However, in the case of an open earphone, the environment where the feedback microphone and the target spatial location (e.g., the position where the tympanic membrane is located) are located are no longer the sound pressure field Thus, the signal received by the feedback microphone is therefore can no longer directly reflect a signal at the target spatial location (e.g., at the tympanic membrane), thus cannot accurately estimate an acoustic signal of opposite phase emitted by a speaker for the active noise reduction, resulting in reduced active noise reduction effect, and a reduced listening experience of the user.

Therefore, it is desired to provide an acoustic device that can open up the user's ears and enhance the user's listening experience.

SUMMARY

Embodiments of the present disclosure may provide an acoustic device, comprising a sound production unit, a first detector, a processor, and a fixing structure, wherein: the sound production unit is configured to generate a first sound signal according to a noise reduction control signal; the first detector is configured to obtain a first residual signal, the first residual signal comprising a residual noise signal formed by superimposition of an environmental noise and the first sound signal at a location where the first detector is located; the processor is configured to estimate a second residual signal at a target spatial location based on the first sound signal and the first residual signal, and update the noise reduction control signal based on the second residual signal; and the fixing structure is configured to place the acoustic device at a location near a user's ear but not blocking the user's ear canal, the target spatial location being closer to the user's ear canal than the first detector.

In some embodiments, wherein the estimating a second residual signal at a target spatial location based on the first sound signal and the first residual signal includes: obtaining a first transfer function between the sound production unit and the first detector, a second transfer function between the sound production unit and the target spatial location, a third transfer function between an environmental noise source and the first detector, and a fourth transfer function between the environmental noise source and the target spatial location; and estimating the second residual signal at the target spatial location based on the first transfer function, the second transfer function, the third transfer function, the fourth transfer function, the first sound signal, and the first residual signal.

In some embodiments, wherein the obtaining a first transfer function between the sound production unit and the first detector, a second transfer function between the sound production unit and the target spatial location, a third transfer function between an environmental noise source and the first detector, and a fourth transfer function between the environmental noise source and the target spatial location includes: obtaining the first transfer function; and determining the second transfer function, the third transfer function, and the fourth transfer function based on the first transfer function and mapping relationships between the first transfer function and the second transfer function, the third transfer function, and the fourth transfer function, respectively.

In some embodiments, wherein the mapping relationships between the first transfer function and the second transfer function, the third transfer function, and the fourth transfer function, respectively, are generated based on test data of the acoustic device in different wearing scenarios.

In some embodiments, wherein the obtaining a first transfer function between the sound production unit and the first detector, a second transfer function between the sound production unit and the target spatial location, a third transfer function between an environmental noise source and the first detector, and a fourth transfer function between the environmental noise source and the target spatial location includes: obtaining the first transfer function; inputting the first transfer function into a trained neural network; and determining outputs of the trained neural network as the second transfer function, the third transfer function, and the fourth transfer function.

In some embodiments, wherein the obtaining the first transfer function includes: calculating the first transfer function based on the noise reduction control signal and the first residual signal.

In some embodiments, wherein the acoustic device further includes a distance sensor, the distance sensor being configured to detect a distance from the acoustic device to the user's ear; and the processor is further configured to determine the first transfer function, the second transfer function, the third transfer function, and the fourth transfer function based on the distance.

In some embodiments, wherein the estimating a second residual signal at a target spatial location based on the first sound signal and the first residual signal includes: obtaining a first transfer function between the sound production unit and the first detector, a second transfer function between the sound production unit and the target spatial location, and a fifth transfer function reflecting a relationship among an environmental noise source, the first detector, and the target spatial location; and estimating the second residual signal at the target spatial location based on the first transfer function, the second transfer function, the fifth transfer function, the first sound signal, and the first residual signal.

In some embodiments, the first transfer function and the second transfer function have a first mapping relationship;

and the fifth transfer function and the first transfer function have a second mapping relationship.

In some embodiments, wherein the estimating a second residual signal at a target spatial location based on the first sound signal and the first residual signal includes: obtaining a first transfer function between the sound production unit and the first detector; and estimating the second residual signal at the target spatial location based on the first transfer function, the first sound signal, and the first residual signal.

In some embodiments, wherein the target spatial location is a location where the user's tympanic membrane is located.

Embodiments of the present specification may also provide a method for determining a transfer function of an acoustic device, wherein the acoustic device includes a sound production unit, a first detector, a processor, and a fixing structure, and the fixing structure is configured to place the acoustic device at a location near a tester's ear but not blocking the tester's ear canal, wherein the method comprises: obtaining, in a scenario in which no environmental noise exists, a first signal generated by the sound production unit based on a noise reduction control signal and a second signal obtained by the first detector, wherein the second signal includes a residual noise signal transmitted by the first signal to the first detector; determining a first transfer function between the sound production unit and the first detector based on the first signal and the second signal; obtaining a third signal obtained by a second detector, wherein the second detector is disposed at a target spatial location, the target spatial location is closer to the tester's ear canal than the first detector, and the third signal includes a residual noise signal transmitted by the first signal to the target spatial location; determining a second transfer function between the sound production unit and the target spatial location based on the first signal and the third signal; obtaining, in a scenario in which the environmental noise exists and the sound production unit does not generate any signal, a fourth signal obtained by the first detector and a fifth signal obtained by the second detector; determining a third transfer function between an environmental noise source and the first detector based on the environmental noise and the fourth signal; and determining a fourth transfer function between the environmental noise source and the target spatial location based on the environmental noise and the fifth signal.

In some embodiments, the method further comprises: determining a plurality of sets of transfer functions for different wearing scenarios or different testers, wherein each set of transfer functions includes a corresponding first transfer function, a corresponding second transfer function, a corresponding third transfer function, and a corresponding fourth transfer function; and determining, based on the plurality of sets of transfer functions, a relationship among the first transfer function, the second transfer function, the third transfer function, and the fourth transfer function.

In some embodiments, wherein the determining, based on the plurality of sets of transfer functions, a relationship among the first transfer function, the second transfer function, the third transfer function, and the fourth transfer function includes: training a neural network by using the plurality of sets of transfer functions as training samples; and determining a trained neural network as the relationship among the first transfer function, the second transfer function, the third transfer function, and the fourth transfer function.

In some embodiments, wherein the relationship among the first transfer function, the second transfer function, the third transfer function, and the fourth transfer function includes: a first mapping relationship between the first transfer function and the second transfer function; and a second mapping relationship between a ratio of the third transfer function to the fourth transfer function and the first transfer function.

In some embodiments, the first transfer function is positively correlated with a ratio of the second signal to the first signal; the second transfer function is positively correlated with a ratio of the third signal to the first signal; the third transfer function is positively correlated with a ratio of the fourth signal to the environmental noise; and the fourth transfer function is positively correlated with a ratio of the fifth signal to the environmental noise.

In some embodiments, wherein the determining, based on the plurality of sets of transfer functions, a relationship among the first transfer function, the second transfer function, the third transfer function, and the fourth transfer function includes: obtaining a distance from the acoustic device to the corresponding tester's ear for the different wearing scenarios or different testers; and determining, based on the distance and the plurality of sets of transfer functions, the relationship among the first transfer function, the second transfer function, the third transfer function, and the fourth transfer function.

In some embodiments, wherein the target spatial location is a location where the user's tympanic membrane is located.

Some additional features of the present disclosure may be explained in the following description. A portion of the additional features of the present disclosure will be apparent to those skilled in the art from a study of the following description and the corresponding accompanying drawings or from an understanding of the production or operation of the embodiments. Features of the present disclosure may be realized and obtained by practicing or using aspects of the methods, tools, and combinations set forth in the following detailed examples.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

DETAILED DESCRIPTION

Figure 1:
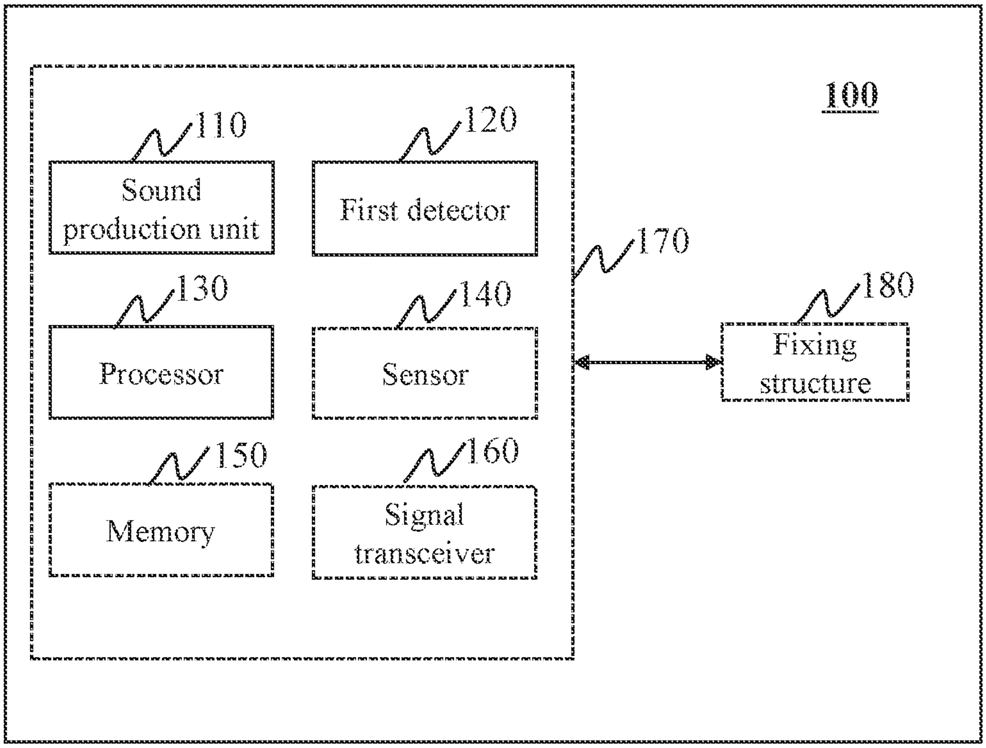
FIG. 1 is a schematic diagram illustrating an exemplary structure of an acoustic device according to some embodiments of the present disclosure.

In order to more clearly illustrate the technical solutions of the embodiments of the present disclosure, a brief description of the accompanying drawings required to be used in the description of the embodiments may be given below. Obviously, the accompanying drawings in the following description are only some examples or embodiments of the present disclosure, and it is possible for a person of ordinary skill in the art to apply the present disclosure to other similar scenarios in accordance with these drawings without creative labor. The present disclosure may be applied to other similar scenarios based on these drawings without the expenditure of creative labor. It should be understood that these exemplary embodiments are given only to enable those skilled in the art to better understand and thus realize the present disclosure, and are not intended to limit the scope of the present disclosure in any way. Unless obviously obtained from the context or the context illustrates otherwise, the same numeral in the drawings refers to the same structure or operation.

It should be understood that the terms "system," "device" as used herein, "unit," and/or "module" as used herein is a method for distinguishing between different components, elements, parts, sections, or assemblies at different levels. However, the words may be replaced by other expressions if other words accomplish the same purpose.

As shown in the present disclosure and the claims, unless the context clearly suggests an exception, the words "one," "an," "a," "one kind," and/or "the" do not refer specifically to the singular, but may also include the plural. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements. The term "based on" is "based at least in part on." The term "one embodiment" means "at least one embodiment"; the term "another embodiment" means "at least one other embodiment".

In the description of the present disclosure, it is to be understood that the terms "first," "second," "third," "fourth," etc. are used only for descriptive purposes and are not to be understood as indicating or implying relative importance or implicitly specifying the number of technical features indicated. Thereby, the limitations "first," "second," "third," and "fourth" may expressly or implicitly include at least one such feature. In the description of the present disclosure, "plurality" means at least two, e.g., two, three, or the like, unless otherwise expressly and specifically limited.

In the present disclosure, unless otherwise expressly specified or limited, the terms "connection," "fixing," etc. are to be understood broadly. For example, the term "connection" may refer to a fixed connection, a removable connection, or a one-piece connection; a mechanical connection, or an electrical connection; a direct connection, an indirect connection through an intermediate medium, a connection within two elements, or an interaction between two elements, unless expressly limited otherwise. To one of ordinary skill in the art, the specific meanings of the above terms in the present disclosure may be understood on a case-by-case basis.

Flowcharts are used in the present disclosure to illustrate operations performed by a system in accordance with embodiments of the present disclosure. It should be appreciated that the preceding or following operations are not necessarily performed in an exact sequence. Instead, steps can be processed in reverse order or simultaneously. Also, it is possible to add other operations to these processes or to remove a step or steps from these processes.

An open acoustic device (e.g., an open acoustic earphone) is an acoustic device that can open a user's ear. The open acoustic device may secure a speaker to be placed at a location close to the user's ear but not blocking the user's ear canal by a fixing structure (e.g., an ear-hook, a head-hook, eyeglasses frames, etc.). When the user uses the open acoustic device, an external environmental noise may also be heard by the user, which results in a poor listening experience. For example, in places where there are many external environmental noises (e.g., streets, scenic spots, etc.), when the user is using the open acoustic device for music playback, the external environmental noises may enter the user's ear canal directly and make the user hear many environmental noises which interfere with the user's music listening experience.

The user's listening experience during the use of the acoustic device can be improved through active noise reduction. However, in the case of the open acoustic device, an environment in which a feedback microphone and a target spatial location (e.g., a position where a tympanic membrane, a basement membrane, etc., is located) are located is not a pressure field environment. Therefore, a signal received by the feedback microphone cannot directly reflect a signal at the target spatial location, and thus the feedback control cannot accurately be performed on an acoustic signal of opposite phase from the speaker, resulting in the inability of effectively implement the the active noise reduction function.

In order to solve the above problems, an acoustic device is provided in embodiments of the present disclosure. The acoustic device may include a sound production unit, a first detector, and a processor. The sound production unit may be used to generate a first sound signal based on a noise reduction control signal. The first detector may be used to obtain a first residual signal. The first residual signal may include a residual noise signal formed by the superposition of an environmental noise and the first sound signal at the first detector. The processor may be used to estimate a second residual signal at a target spatial location based on the first sound signal and the first residual signal, and update a noise reduction control signal for controlling the sound production of the sound production unit based on the second residual signal. The fixing structure may be used to place the acoustic device at a location near the user's ear but not blocking the user's ear canal, and the target spatial location is closer to the user's ear canal than the first detector.

In the embodiments of the present disclosure, the processor may accurately estimate the second residual signal at the target spatial location by utilizing transfer functions among the sound production unit, the first detector, a noise source, and the target spatial location and/or mapping relationships among the transfer functions. In turn, the processor may accurately control the sound production unit to generate a noise reduction signal to effectively reduce the environmental noise at the user's ear canal (e.g., at the target spatial location), henceforth realizing the active noise reduction of the acoustic device and improving the user's listening experience while using the acoustic device.

The acoustic device provided by embodiments of the present disclosure and a method for determining transfer functions thereof are described in detail below in conjunction with the accompanying drawings.

FIG. 1 is a schematic diagram illustrating an exemplary structure of an acoustic device according to some embodiments of the present disclosure. In some embodiments, an acoustic device 100 may be an open acoustic device, which can perform an active noise reduction on an external noise. In some embodiments, the acoustic device 100 may include an earphone, glasses, an Augmented Reality (AR) device, a Virtual Reality (VR) device, or the like. As shown in FIG. 1, the acoustic device 100 may include a sound production unit 110, a first detector 120, and a processor 130. In some embodiments, the sound production unit 110 may generate a first sound signal based on a noise reduction control signal.

The first detector 120 may pick up a first residual signal formed by the superposition of an environmental noise and the first sound signal at the first detector 120, convert the first residual signal into an electrical signal, and transmit the electrical signal to the processor 130 for processing. The processor 130 may couple (e.g., electrically connect) with the first detector 120 and the sound production unit 110. The processor 130 may receive the electrical signal transmitted by the first detector 120 and process the electrical signal. For example, the processor 130 may estimate a second residual signal at a target spatial location based on the first sound signal and the first residual signal, and update a noise reduction control signal for controlling the sound production of the sound production unit 110 based on the second residual signal. The sound production unit 110 may generate an updated noise reduction signal in response to the updated noise reduction control signal, thereby realizing the active noise reduction.

The sound production unit 110 may be configured to output a sound signal. For example, the sound production unit 110 may output the first sound signal based on the noise reduction control signal. As another example, the sound production unit 110 may output a voice signal based on a voice control signal. In some embodiments, the sound signal generated by the sound production unit 110 based on the noise reduction control signal (e.g., the first sound signal, the updated first sound signal, etc.) may also be referred to as a noise reduction signal. The noise reduction signal generated by the sound production unit 110 may reduce or eliminate an environmental noise transmitted at the target spatial location (e.g., a location in a user's ear canal, for example, at the tympanic membrane, the base membrane) to realize the active noise reduction of the acoustic device 100, thereby improving the user's listening experience while using the acoustic device 100.

In the present disclosure, the noise reduction signal may be a sound signal that is opposite in phase or substantially opposite in phase to the environmental noise, and the active noise reduction is achieved by partially or fully canceling sound waves of the noise reduction signal with sound waves of the environmental noise. Understandably, the user may choose a degree of active noise reduction according to an actual need. For example, the degree of active noise reduction may be adjusted by adjusting the amplitude of the noise reduction signal. In some embodiments, an absolute value of a phase difference between a phase of the noise reduction signal and a phase of the environmental noise at the target spatial location may be within a preset phase range. The preset phase range may be in a range of 90-180 degrees. The absolute value of the phase difference between the phase of the noise reduction signal and the phase of the environmental noise at the target spatial location may be adjusted within the preset phase range according to the needs of the user. For example, when the user does not wish to be disturbed by a sound of a surrounding environment, the absolute value of the phase difference may be a relatively large value, such as 180 degrees, i.e., to make the phase of the noise reduction signal be opposite to the phase of the environmental noise at the target spatial location. As another example, when the user wishes to be sensitive to the surrounding environment, the absolute value of the phase difference may be a relatively small value, such as 90 degrees. It is important to note that the more the user wishes to receive the sound of the surrounding environment (i.e., the environmental noise), the closer the absolute value of the phase difference may be to 90 degrees; the less the user wishes to receive the sound of the surrounding environment, the closer the absolute value of the phase difference may be to 180 degrees. In some embodiments, when the phase of the noise reduction signal and the phase of the environmental noise at the target spatial location satisfy a certain condition (e.g., opposite phases), an amplitude difference between the environmental noise at the target spatial location and an amplitude of the noise reduction signal may be within a preset amplitude range. For example, when the user does not want to be disturbed by the sound of the surrounding environment, the amplitude difference may be a small value, such as 0 dB, i.e., the amplitude of the noise reduction signal is equal to the amplitude of the environmental noise at the target spatial location. As another example, when the user wishes to be sensitive to the surrounding environment, the amplitude difference may be a relatively large value, such as approximately equal to the amplitude of the environmental noise at the target spatial location. It should be noted that the more sound of the surrounding environment the user wishes to receive, the closer the amplitude difference may be to the amplitude of the environmental noise at the target spatial location, and the less sound of the surrounding environment the user wishes to receive, the closer the amplitude difference may be to 0 dB.

In some embodiments, the sound production unit 110 may be located at a location near the user's ear when the user is wearing the acoustic device 100. In some embodiments, according to an operation principle of the sound production unit 110, the sound production unit 110 may include an electrically powered speaker (e.g., a moving coil speaker), a magnetic speaker, an ionic speaker, an electrostatic speaker (or a capacitive speaker), a piezoelectric speaker, or the like, or any combination thereof. In some embodiments, according to a propagation mode of a sound output from the sound production unit 110, the sound production unit 110 may include an air-conducting speaker and/or a bone-conducting speaker. In some embodiments, when the sound production unit 110 is a bone-conducting speaker, the target spatial location may be a location where the user's base membrane is located. When the sound production unit 110 is an air-conducting speaker, the target spatial location may be a location where the user's tympanic membrane is located, which ensures that the acoustic device 100 can have a good active noise reduction effect.

In some embodiments, a count of sound production units 110 may be one or more. When the count of sound production units 110 is one, the sound production unit 110 may be used to output the noise reduction signal to cancel out the environmental noise and may also be used to transmit sound information that the user needs to hear (e.g., audio from a device media, audio from a remote device for calls) to the user. For example, when the count of sound production units 110 is one and the sound production unit 110 is an air-conducting speaker, the air-conducting speaker may be used to output the noise reduction signal to cancel out the environmental noise. In this case, the noise reduction signal may be a sound wave (i.e., the vibration of air), the sound wave may be transmitted through the air to the target spatial location and cancel each other out with the environmental noise at the target spatial location. Also, the air-conducting speaker may be used to transmit the sound information that the user needs to hear to the user. As another example, when the count of sound production unit 110 is one and the sound production unit 110 is a bone-conducting speaker, the bone-conducting speaker may be used for outputting the noise reduction signal to cancel out the environmental noise. In this case, the noise reduction signal may be a vibration signal (e.g., the vibration of a speaker casing), the vibration signal may be transmitted to the user's basement membrane via bones or tissues and cancel with the environmental noise at the user's basement membrane. Also, the bone-conducting speaker may be used to transmit the sound information that the user needs to hear to the user. When the count of sound production units 110 is multiple, a portion of the multiple sound production units 110 may be used to output the noise reduction signal to cancel out the environmental noise, and another portion of the multiple sound production units 110 may be used to transmit the sound information that the user needs to hear to the user (e.g., an audio from a device media, an audio from a remote device for calls). For example, when the count of sound production units 110 is multiple and the multiple sound production units 110 include a bone-conducting speaker and an air-conducting speaker, the air-conducting speaker may be used to output sound waves to reduce or cancel out the environmental noise, and the bone-conducting speaker may be used to transmit the sound information that the user needs to hear to the user. Compared to the air-conducting speaker, the bone-conducting speaker may transmit a mechanical vibration directly through the user's body (e.g., bones, skin tissues, etc.) to the user's auditory nerve, in which there is less interference with an air-conducting microphone that picks up the environmental noise.

It should be noted that the sound production unit 110 may be an independent functional device or may be part of a single device capable of performing multiple functions. Merely by way of example, the sound production unit 110 may be integrated and/or formed as one with the processor 130. In some embodiments, when the count of sound production units 110 is multiple, the arrangement manner of the multiple sound production units 110 may include a linear array (e.g., rectilinear, curved), a planar array (e.g., cruciform, reticulated-shaped, circular, annular, polygonal, and other regular and/or irregular shapes), a three-dimensional array (e.g., cylindrical, spherical, hemispherical, polyhedral, etc.), or the like, or any combination thereof, and the present disclosure is not limited herein. In some embodiments, the sound production unit 110 may be disposed at the user's left and/or right ear. For example, the sound production unit 110 may include a first sub-speaker and a second sub-speaker. The first sub-speaker may be disposed at the user's left ear and the second sub-speaker may be disposed at the user's right ear. The first sub-speaker and the second sub-speaker may be in a working state at the same time, or one of the first sub-speaker or the second sub-speaker may be controlled to be in the working state. In some embodiments, the sound production unit 110 may be a speaker with a directional sound field, with a main lobe pointing to the user's ear canal.

The first detector 120 may be configured to pick up the sound signal. For example, the first detector 120 may pick up a voice signal of a user. As another example, the first detector 120 may pick up the first residual signal. In some embodiments, the first residual signal may include a residual noise signal formed by the superposition of the environmental noise and the first sound signal (i.e., the noise reduction signal) generated by the sound production unit 110 at the first detector 120. In other words, the first detector 120 may pick up both the environmental noise and the noise reduction signal generated by the sound production unit 110. Further, the first detector 120 may convert the first residual signal into an electrical signal and transmit the electrical signal to the processor 130 for processing.

In the present disclosure, the environmental noise may refer to a combination of a plurality of external sounds in an environment in which the user is located. Merely by way of example, the environmental noise may include one or more of a traffic noise, an industrial noise, a construction noise, a social noise, or the like. The traffic noise may include, but is not limited to, a traveling noise of motor vehicles, a honking noise, or the like. The industrial noise may include, but is not limited to, a noise generating during the operation of a power machinery in a factory, or the like. The construction noise may include, but is not limited to, a power machinery excavation noise, a hole-drilling noise, a mixing noise, or the like. The social noise may include, but is not limited to, a mass gathering noise, a recreation and propaganda noise, a crowd noise, a household appliance noise, or the like.

In some embodiments, the environmental noise may include a sound of a user speaking. For example, the first detector 120 may pick up the environmental noise based on a calling state of the acoustic device 100. When the acoustic device 100 is in a non-calling state, a sound generated by the user's own speech may be considered as the environmental noise, and the first detector 120 may pick up the sound of the user's own speech and other environmental noises simultaneously. When the acoustic device 100 is in the calling state, the sound generated by the user's own speech may not be considered as the environmental noise, and the first detector 120 may pick up the environmental noise in addition to the sound of the user's own speech. For example, the first detector 120 may pick up a noise emitted by a noise source that is a certain distance (e.g., 0.5 meters, 1 meter) away from the first detector 120. As another example, the first detector 120 may pick up a noise that differs significantly (e.g., a frequency, volume, or sound pressure greater than a certain threshold) from the sound produced by the user's own speech.

In some embodiments, the first detector 120 may be disposed at a location close to the user's ear canal for picking up the environmental noise and/or the first sound signal transmitted to the user's ear canal. For example, when the user is wearing the acoustic device 100, the first detector 120 may be disposed on a side of the sound production unit 110 toward the user's ear canal (as shown by the first detector 220 and the sound production unit 210 in FIG. 2). In some embodiments, the first detector 120 may be disposed at the user's left and/or right ear. In some embodiments, the first detector 120 may include one or more air-conducting microphones (which may also be referred to as a feedback microphone), e.g., the first detector 120 may include a first sub-microphone (or microphone array) and a second sub-microphone (or microphone array). The first sub-microphone (or microphone array) may be located at the user's left ear, and the second sub-microphone (or microphone array) may be located at the user's right ear. The first sub-microphone (or microphone array) and the second sub-microphone (or microphone array) may be controlled to be in the working state at the same time or only one of them may be controlled to be in the working state.

In some embodiments, according to the operation principle of the microphone, the first detector 120 may include a moving coil microphone, a ribbon microphone, a condenser microphone, an electret microphone, an electromagnetic microphone, a carbon particle microphone, etc., or any combination thereof. In some embodiments, the arrangement of the first detector 120 may include a linear array (e.g., rectilinear, curved), a planar array (e.g., cruciform, circular, annular, polygonal, reticulated-shaped, and other regular and/or irregular shapes), a three-dimensional array (e.g., cylindrical, spherical, hemispherical, polyhedral, etc.), or the like, or any combination thereof.

The processor 130 may be configured to estimate the noise reduction signal of the sound production unit 110 based on an external noise signal, so that the noise reduction signal generated by the sound production unit 110 is able to reduce or cancel out the environmental noise heard by the user and realize the active noise reduction. Specifically, the processor 130 may estimate a second residual signal at a target spatial location based on the first sound signal generated by the sound production unit 110 and the first residual signal obtained by the first detector 120 (comprising the residual noise signal formed by the superposition of the environmental noise and the first sound signal at the first detector 120). The processor 130 may further update the noise reduction control signal for controlling the sound generation of the sound production unit 110 based on the second residual signal. The sound production unit 110 may generate a new noise reduction signal in response to the updated noise reduction control signal, thereby realizing a real-time correction of the noise reduction signal to achieve a good active noise reduction effect.

In the present disclosure, the target spatial location may refer to a spatial location at a specific distance from the user's tympanic membrane. The target spatial location may be closer to the user's ear canal (e.g., the tympanic membrane) than the first detector 120. The specific distance here may be a fixed distance, e.g., 0 cm, 0.5 cm, 1 cm, 2 cm, 3 cm, etc. In some embodiments, the target spatial location may be inside the ear canal or outside the ear canal. For example, the target spatial location may be a location of the tympanic membrane, a location of the base membrane, or another location outside the ear canal. In some embodiments, a count of microphones in the first detector 120 and a distribution location with respect to the user's ear canal may be correlated with the target spatial location. The count of microphones in the first detector 120 and/or the distribution location with respect to the user's ear canal may be adjusted based on the target spatial location. For example, the count of microphones in the first detector 120 may increase when the target spatial location is closer to the user's ear canal. As another example, when the target spatial location is closer to the user's ear canal, a distance between each microphone in the first detector 120 may also decrease. As a further example, when the target spatial location is closer to the user's ear canal, the arrangement of the microphones in the first detector 120 may also change.

In some embodiments, the processor 130 may obtain a first transfer function between the sound production unit 110 and the first detector 120, a second transfer function between the sound production unit 110 and the target spatial location, a third transfer function between an environmental noise source and the first detector 120, a fourth transfer function between the environmental noise source and the target spatial location, respectively. The processor 130 may estimate the second residual signal at the target spatial location based on the first transfer function, the second transfer function, the third transfer function, the fourth transfer function, the first sound signal, and the first residual signal. In some embodiments, instead of obtaining the third transfer function and the fourth transfer function separately, the processor 130 may only need to obtain a ratio of the fourth transfer function to the third transfer function to determine the second residual signal. In such embodiments, the processor 130 may obtain the first transfer function between the sound production unit 110 and the first detector 120, the second transfer function between the sound production unit 110 and the target spatial location, and a fifth transfer function reflecting a relationship among the environmental noise source, the first detector 120, and the target spatial location (e.g., the ratio of the fourth transfer function to the third transfer function). The processor 130 may estimate the second residual signal at the target spatial location based on the first transfer function, the second transfer function, the fifth transfer function, the first sound signal, and the first residual signal. In some embodiments, the processor 130 may obtain only the first transfer function between the sound production unit 110 and the first detector 120, and further estimate the second residual signal at the target spatial location based on the first transfer function, the first sound signal, and the first residual signal. Further details regarding the processor 130 estimates the second residual signal at the target spatial location can be found with reference to other locations of the present disclosure (e.g., FIG. 3 of the present disclosure and its related descriptions), which may not be described herein at this time.

In some embodiments, the processor 130 may include a hardware module and a software module. Merely by way of example, the hardware module may include digital signal processor (DSP) chips and advanced RISC machines (ARM), and the software module may include an algorithm module.

In some embodiments, the acoustic device 100 may further include one or more third detectors (not shown). In some embodiments, the third detector may also be referred to as a feed-forward microphone. The third detector may be located further away from the target spatial location compared to the first detector 120, i.e., the feed-forward microphone may be closer to a noise source compared to the feedback microphone. The third detector may be configured to pick up an environmental noise transmitted to the third detector, convert the picked up environmental noise into an electrical signal, and transmit the electrical signal to the processor 130 for processing. The processor 130 may determine the noise reduction control signal based on the environmental noise picked up by the third detector and the above-mentioned estimated signal at the target spatial location. Specifically, the processor may receive the electrical signal converted by the environmental noise transmitted by the third detector and process the electrical signal to estimate the environmental noise at the target spatial location (e.g., the amplitude, phase, etc., of the noise). The processor 130 may further generate the noise reduction control signal based on the estimated noise signal at the target spatial location. Further, the processor 130 may send the noise reduction control signal to the sound production unit 110. The sound production unit 110 may generate a new noise reduction signal in response to the noise reduction control signal. Parameters of the new noise reduction signal (e.g., the amplitude, phase, etc.) may correspond to parameters of the environmental noise. Merely by way of example, the amplitude of the new noise reduction signal may be approximately equal to the amplitude of the environmental noise, and the phase of the new noise reduction signal may be approximately opposite to the phase of the environmental noise, thereby ensuring that the new noise reduction signal generated by the sound production unit 110 can maintain the good active noise reduction effect.

In some embodiments, the third detector may be disposed at the user's left and/or right ears. For example, a count of third detectors may be one, which may be disposed at the user's left ear when the user uses the acoustic device 100. As another example, the count of the third detectors may be more than one, and when the user uses the acoustic device 100, the third detector may be distributed at the user's left ear and the right ear, thereby enabling the acoustic device 100 to better receive spatial noises from different sides. In some embodiments, the third detector may be distributed at various locations of the acoustic device 100, and when the user uses the acoustic device 100, a plurality of third detectors may be disposed at the user's left ear and right ear, or may be located around the user's head.

In some embodiments, the third detector may be disposed in a target area to minimize interference signals from the sound production unit 110 to the third detector. When the sound production unit 110 is a bone-conducting speaker, the interference signal may include a leakage signal and a vibration signal from the bone-conducting speaker, and the target area may be an area where a total energy of the leakage signal and the vibration signal transmitted from the bone-conducting speaker to the third detector is minimal. When the sound production unit 110 is an air-conducting speaker, the target area may be an area where the sound pressure level of the radiated sound field of the air-conducting speaker is minimal.

In some embodiments, the third detector may include one or more air-conducting microphones. For example, when the user is listening to music using the acoustic device 100, the air-conducting microphone may obtain both a noise of the external environment and a sound of the user's voice as he or she is speaking, and determine the noise of the external environment and the sound of the user's voice together as the environmental noise. In some embodiments, the third detector may include one or more bone-conducting microphones. The bone-conducting microphone may be in direct contact with the user's skin, and the vibration signal generated by the user's skeleton or muscles when the user is speaking may be directly transmitted to the bone-conducting microphone. The bone-conducting microphone may convert the vibration signal to an electrical signal, and transmit the electrical signal to the processor 130 for processing. In some embodiments, the bone-conducting microphone may not be in direct contact with a human body. The vibration signal generated by the user's skeleton or muscles as the user speaks may be transmitted to the casing of the acoustic device 100, and then be transmitted to the bone-conducting microphone by the casing. In some embodiments, when the user is in a talking state, the processor 130 may take the sound signal acquired by the air-conducting microphone as environmental noise and utilize the environmental noise for noise reduction, and take the sound signal acquired by the bone-conducting microphone as voice signals to be transmitted to a terminal device, thereby ensuring the call quality (i.e., the quality of the speaking voice from the object with which the current user of the acoustic device 100 is talking to the current user) when the user is talking.

In some embodiments, the processor 130 may control an on/off state of the bone-conducting microphone and/or the air-conducting microphone in the third detector based on the working state of the acoustic device 100. The working state of the acoustic device 100 may refer to a usage state of the acoustic device 100 when the user wears the acoustic device 100. For example, the working state of the acoustic device 100 may include, but is not limited to, a calling state, a non-calling state (e.g., a music playing state), a voice message sending state, etc. In some embodiments, when the third detector picks up the environmental noise and the voice signal, the on/off state of the bone-conducting microphone and the on/off state of the air-conducting microphone in the third detector may be determined based on the working state of the acoustic device 100. For example, when the user wears the acoustic device 100 for music playback, the on/off state of the bone-conducting microphone may be a standby state, and the on/off state of the air-conducting microphone may be a working state. As another example, when the user wears the acoustic device 100 for sending a voice message, the on/off state of the bone-conducting microphone may be a working state and the on/off state of the air-conducting microphone may be a working state. In some embodiments, the processor 130 may control the on/off state of a microphone (e.g., the bone-conducting microphone, the air-conducting microphone) in the third detector by sending a control signal.

In some embodiments, when the acoustic device 100 is in the non-calling state (e.g., a music playing state), the processor 130 may control the bone-conducting microphone in the third detector to be in the standby state, and the air-conducting microphone to be in the working state. When the acoustic device 100 is in the non-calling state, a sound signal of the user's own speech may be considered as the environmental noise. In this case, the sound signal of the user's own speech included in the environmental noise picked up by the air-conducting microphone may be unfiltered, such that the sound signal of the user's own speech may also cancel out with the noise reduction signal generated by the sound production unit 110 as part of the environmental noise. When the working state of the acoustic device 100 is the calling state, the processor 130 may control both the bone-conducting microphone and the air-conducting microphone in the third detector to be in the working state. When the acoustic device 100 is in the calling state, the sound signal of the user's own speech needs to be retained. In this case, the processor 130 may send the control signal to control the bone-conducting microphone to be in the working state, and the bone-conducting microphone may pick up the sound signal of the user's speech. The processor 130 may remove the sound signal of the user's speech picked up by the bone-conducting microphone from the environmental noise picked up by the air-conducting microphone, so that the sound signal of the user's own speech does not cancel out with the noise reduction signal generated by the sound production unit 110, thereby ensuring a normal calling state of the user.

In some embodiments, when the working state of the acoustic device 100 is the calling state, the processor 130 may control the bone-conducting microphone in the third detector to remain in the working state if a sound pressure of the environmental noise is greater than a predetermined threshold. The sound pressure of the environmental noise may reflect an intensity of the environmental noise. The predetermined threshold here may be a value pre-stored in the acoustic device 100, for example, 50 dB, 60 dB, 70 dB, and other arbitrary values. When the sound pressure of the environmental noise is greater than the predetermined threshold, the environmental noise affects the call quality of the user. The processor 130 may control the bone-conducting microphone to remain in the working state by sending a control signal, and the bone-conducting microphone may obtain a vibration signal of facial muscles of the user when the user speaks without essentially picking up the external environmental noise. At this time, the vibration signal picked up by the bone-conducting microphone is used as a voice signal when the user calls, thereby ensuring the normal calling state of the user.

In some embodiments, when the working state of the acoustic device 100 is the calling state, the processor 130 may control the bone-conducting microphone to switch from the working state to the standby state if the sound pressure of the environmental noise is less than the predetermined threshold. When the sound pressure of the environmental noise is less than the predetermined threshold, the sound pressure of the environmental noise is small relative to the sound pressure of the sound signal generated by the user while speaking. In such a case, after the user's speaking voice transmitted to the user's ear through a first acoustic path is partially canceled out by the noise reduction signal outputted from the sound production unit 110 that is transmitted to the user's ear through a second acoustic path, the remaining speaking voice of the user is still sufficient to ensure a normal call of the user (for example, the user's speaking voice canceled by the noise reduction signal may be used as a voice signal for the call, and the voice signal may be converted into an electrical signal, transmitted to another acoustic device, and then converted into a voice signal by a sound production unit in the acoustic device, so that an other party user during the call may hear a local user's speaking voice). In this case, the processor 130 may control the bone-conducting microphone in the third detector to be switched from the working state to the standby state by sending a control signal, thereby reducing a signal processing complexity and a power loss of the acoustic device 100. It is to be appreciated that when the sound production unit 110 is an air-conducting speaker, a specific location where the noise reduction signal and the environmental noise cancel each other out may be the user's ear canal or a vicinity thereof, e.g., a location of the tympanic membrane (i.e., the target spatial location). The first acoustic path may be a path in which the environmental noise is transmitted from the noise source to the target spatial location, and the second acoustic path may be a path in which the noise reduction signal is transmitted from the air-conducting speaker through the air to the target spatial location. When the sound production unit 110 is a bone-conducting speaker, a specific location at which the noise reduction signal and the environmental noise cancel each other out may be at the user's basement membrane. The first acoustic path may be a path for the environmental noise going from the noise source, through the user's ear canal and the tympanic membrane, to the user's basement membrane, and the second acoustic path may be a path for the noise reduction signal going from the bone-conducting speaker, through the user's bones or tissues, to the user's basement membrane.

In some embodiments, the acoustic device 100 may also include one or more sensors 140. The one or more sensors 140 may be electrically connected to other components of the acoustic device 100 (e.g., the processor 130). The one or more sensors 140 may be used to obtain a physical location and/or motion information of the acoustic device 100. Merely by way of example, the one or more sensors 140 may include an inertial measurement unit (IMU), a global position system (GPS), a radar, or the like. The motion information may include a motion trajectory, a motion direction, a motion speed, a motion acceleration, an angular velocity of motion, time information related to motion (e.g., a motion start time, a motion end time), or the like, or any combination thereof. Taking the IMU as an example, the IMU may include a microelectronic mechanical system (MEMS). The microelectronic mechanical system may include a multi-axis accelerometer, a gyroscope, a magnetometer, etc., or any combination thereof. The IMU may be used to detect the physical location and/or motion information of the acoustic device 100 to enable control of the acoustic device 100 based on the physical location and/or motion information.

In some embodiments, the one or more sensors 140 may include a distance sensor. The distance sensor may be used to detect a distance from the acoustic device 100 to the user's ear (e.g., a distance from the sound production unit 110 and the target spatial location). A current wearing posture or usage scenario of the acoustic device 100 may be determined based on the distance, and transfer functions among the sound production unit 110, the first detector 120, and the target spatial location may be determined. More about determining the transfer function based on the distance may be found in FIG. 3 or FIG. 4 and their descriptions, which will not be repeated here.

In some embodiments, the acoustic device 100 may include a memory 150. The memory 150 may store data, instructions, and/or any other information. For example, the memory 150 may store transfer functions among the sound production unit 110, the first detector 120, and the target spatial location for different users and/or different wearing postures. As another example, the memory 150 may store mapping relationships of the transfer functions among the sound production unit 110, the first detector 120, and the target spatial location for different users and/or different wearing postures. As a further example, the memory 150 may store data and/or computer programs for implementing a process 300 shown in FIG. 3. As still an example, the memory 150 may also be used to store a trained neural network. It is important to know that different users may have different organizational forms (e.g., different head sizes, different compositions of human tissues such as muscle tissues, fat tissues, bones, etc.), so a corresponding first transfer function, a corresponding second transfer function, a corresponding third transfer function, and a corresponding fourth transfer function may be different. The different wearing postures may refer to different wearing locations, different wearing directions, and different forces between the acoustic device 100 and the user, etc., when the user wears the acoustic device 100, and the corresponding first transfer function, the corresponding second transfer function, the corresponding third transfer function, and the corresponding fourth transfer function may also be different.

In some embodiments, the memory 150 may include a mass memory, a removable memory, a volatile read-write memory, a read-only memory (ROM), etc., or any combination thereof. The memory 150 may be signal-coupled to the processor 130. When the user wears the acoustic device 100, the processor 130 may, based on the user's compositional form, wearing posture, or the like, obtain the corresponding first transfer function, the corresponding second transfer function, the corresponding third transfer function, and the corresponding fourth transfer function from the memory 150. The processor 130 may estimate the second residual signal at the target spatial location (e.g., at the tympanic membrane) based on the corresponding first transfer function, the corresponding second transfer function, the corresponding third transfer function, and the corresponding fourth transfer function to generate a more accurate noise reduction control signal, so that a sound wave of opposite phase generated by the sound production unit 110 in response to the noise reduction control signal may have better active noise reduction effect.

In some embodiments, the acoustic device 100 may include a signal transceiver 160. The signal transceiver 160 may be electrically connected to other components of acoustic device 100 (e.g., the processor 130). In some embodiments, the signal transceiver 160 may include Bluetooth, an antenna, etc. The acoustic device 100 may communicate with other external devices (e.g., cell phones, tablets, smartwatches) via the signal transceiver 160. For example, the acoustic device 100 may communicate wirelessly with other devices via Bluetooth.

In some embodiments, the acoustic device 100 may include a casing structure 170. The casing structure 170 may be configured to carry other components of the acoustic device 100 (e.g., the sound production unit 110, the first detector 120, the processor 130, the distance sensor 140, the memory 150, the signal transceiver 160, etc.). In some embodiments, the casing structure 170 may be a closed or semi-closed structure that is internally hollow and the other components of the acoustic device 100 are located in or on the casing structure. In some embodiments, the shape of the casing structure may be a regular or irregular three-dimensional structure such as a cuboid, a cylinder, a truncated cone, or the like. When the user wears the acoustic device 100, the casing structure may be located near the user's ear. For example, the casing structure may be disposed on a circumferential side (e.g., a front or back side) of the user's ear. As another example, the casing structure may be disposed on the user's ear but not blocking or covering the user's ear canal. In some embodiments, the acoustic device 100 may be a bone-conducting headset, wherein at least one side of the casing structure may be in contact with the user's skin. An acoustic driver (e.g., a vibration speaker) in the bone-conducting headset may convert an audio signal into a mechanical vibration, which may be transmitted through the casing structure and through the user's bones to the user's auditory nerve. In some embodiments, the acoustic device 100 may be an air-conducting headset, wherein at least one side of the casing structure may or may not be in contact with the user's skin. A sidewall of the casing structure includes at least one sound-conducting hole, and a speaker in the air-conducting headset converts an audio signal into an air-conducting sound, which may be radiated along a direction of the user's ear through the sound-conducting hole.

In some embodiments, the acoustic device 100 may include a fixing structure 180. The fixing structure 180 may be configured to place the acoustic device 100 in a location near the user's ear without blocking the user's ear canal. In some embodiments, the fixing structure 180 may be physically coupled (e.g., snap-fitting, threaded connection, etc.) to the casing structure 170 of the acoustic device 100. In some embodiments, the casing structure 170 of the acoustic device 100 may be part of the fixing structure 180. In some embodiments, the fixing structure 180 may include an ear-hook, a back-hook, an elastic band, an eyewear leg, or the like, which allows the acoustic device 100 to be better placed at a location near the user's ear to prevent the acoustic device 100 from falling off. For example, the fixing structure 180 may be an ear-hook, which may be configured to be worn around the ear. In some embodiments, the ear-hook may be a continuous hook and may be elastically stretched to be worn on the user's ear. Meanwhile, the ear-hook may also exert pressure on the user's ear, causing the acoustic device 100 to be securely placed at a particular location on the user's ear or head. In some embodiments, the ear-hook may be a discontinuous band. For example, the ear-hook may include a rigid portion and a flexible portion. The rigid portion may be made of a rigid material (e.g., plastic or metal), and the rigid portion may be physically coupled (e.g., snap-fitting, threaded connection, etc.) with the casing structure 170 of the acoustic device 100 by way of fixed. The flexible portion may be made of a resilient material (e.g., fabric, composite material, or/and neoprene). As another example, the fixing structure 180 may be a neck strap configured to be worn around the neck/shoulder of the user. As a further example, the fixing structure 180 may be eyeglasses legs, which are erected over the user's ears as part of the eyeglasses.

In some embodiments, the acoustic device 100 may further include an interaction module (not shown) for adjusting the sound pressure of the noise reduction signal. In some embodiments, the interaction module may include a button, a voice assistant, a gesture sensor, or the like. The user may adjust a noise reduction mode of the acoustic device 100 by controlling the interaction module. Specifically, the user may adjust (e.g., zoom in or zoom out) amplitude information of the noise reduction signal by controlling the interaction module so as to change the sound pressure of the noise reduction signal generated by the sound production unit 110, henceforth achieving different noise reduction effects. Merely by way of example, the noise reduction mode may include a strong noise reduction mode, an intermediate noise reduction mode, a weak noise reduction mode, or the like. For example, when the user wears the acoustic device 100 indoors and the external environmental noise is low, the user may turn off the noise reduction mode of the acoustic device 100 or adjust the noise reduction model to the weak noise reduction mode through the interaction module. As another example, when the user wears the acoustic device 100 while walking in a public place such as a street, the user needs to listen to the audio signal (e.g., music, voice message) while maintaining a certain degree of sensibility to a surrounding environment to cope with an unexpected situation, at which time the user may select the intermediate noise reduction mode through the interaction module (e.g., a button or a voice assistant) to preserve a surrounding environmental noise (e.g., sirens, crashes, car horns, etc.). Furthermore, for example, when the user is traveling on a vehicle such as a subway or an airplane, the user may select the strong noise reduction mode through the interaction module to further reduce the environmental noise. In some embodiments, the processor 130 may also send, based on an intensity range of environmental noise, to the acoustic device 100 or a terminal device (e.g., a cell phone, a smartwatch, etc.) communicatively coupled to the acoustic device 100 an alert message to remind the user to adjust the noise reduction mode.

It should be noted that the above description of FIG. 1 is provided for illustrative purposes only and is not intended to limit the scope of the present disclosure. For those of ordinary skill in the art, a wide variety of variations and modifications may be made in accordance with the guidance of the present disclosure. In some embodiments, one or more components of the acoustic device 100 (e.g., the distance sensor 140, the signal transceiver 160, the fixing structure 180, the interaction module, etc.) may be omitted. In some embodiments, one or more components of the acoustic device 100 may be replaced by other elements that can perform similar functions. For example, the acoustic device 100 may not include the fixing structure 180. The casing structure 170 or a portion thereof may be a casing structure having a human ear-adapted shape (e.g., circular, elliptical, polygonal (regular or irregular), U-shape, V-shape, semicircular) so that the casing structure may be hooked up near the user's ear. In some embodiments, a component in the acoustic device 100 may be split into a plurality of sub-components, or a plurality of components may be combined into a single component. These changes and modifications do not depart from the scope of the present disclosure.

Figure 2:
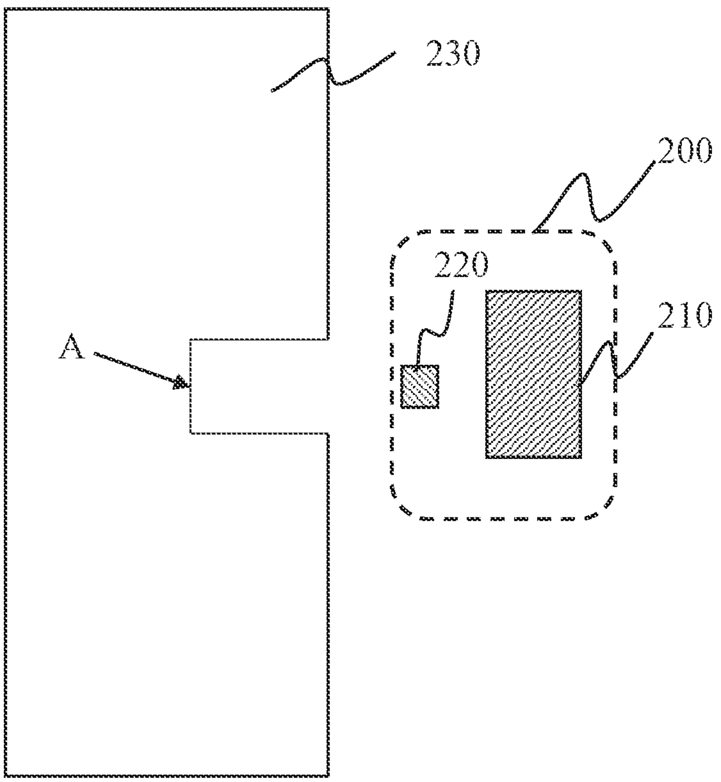
FIG. 2 is a schematic diagram illustrating an exemplary wearing state of an acoustic device according to some embodiments of the present disclosure.

FIG. 2 is a schematic diagram illustrating an exemplary wearing state of an acoustic device according to some embodiments of the present disclosure. As shown in FIG. 2, when the acoustic device 200 is worn by a user, the acoustic device 200 may be placed at a location near the user's ear 230 (or head) but not blocking the user's ear canal. The acoustic device 200 may include a sound production unit 210 and a first detector 220.

In some embodiments, the first detector 220 may be disposed on a side of the sound production unit 210 toward the user's ear canal. In some embodiments, a ratio of an acoustic path from the first detector 220 to a target spatial location A to an acoustic path from the first detector 220 to the sound production unit 210 may be in a range of 0.5-20. In some embodiments, the acoustic path from the first detector 220 to the target spatial location A may be in a range of 5 mm-50 mm. In some embodiments, the acoustic path from the first detector 220 to the target spatial location A may be in a range of 15 mm-40 mm. In some embodiments, the acoustic path from the first detector 220 to the target spatial location A may be in a range of 25 mm-35 mm. In some embodiments, a count of microphones in the first detector 220 and/or distribution positions of the microphones relative to the user's ear canal may be adjusted based on the acoustic path from the first detector 220 to the target spatial location A.

Since the acoustic device 200 is an open acoustic device (e.g., an open headset), an environment in which the first detector 220 and the target spatial location A (e.g., a location close to the user's ear canal and at a specific distance from the tympanic membrane) are located is no longer a pressure field environment. Therefore, a signal received by the first detector 220 may not be exactly the same as a signal at the target spatial location A. In this case, by obtaining a corresponding relationship between a sound signal at the first detector 220 and a sound signal at the target spatial location A, and thus determining the sound signal at the target spatial location A, the more accurate noise reduction may be performed at the target spatial location A.

It should be noted that the schematic diagram of the wearing state of the acoustic device shown in FIG. 2 is only an exemplary illustration, and in embodiments of the present disclosure, relative positional relationships among the first detector 220, the target spatial location A, and the sound production unit 210 may be but are not limited to that shown in FIG. 2. For example, in some embodiments, the sound production unit 210, the first detector 220, and the target spatial location A may not be in the same straight line. For example, in some embodiments, the first detector 220 may be disposed on a side of the sound production unit 210 that is back from the target spatial location A, and a distance from the first detector 220 to the target spatial location A may be greater than a distance from the sound production unit 210 to the target spatial location A.

Figure 3:
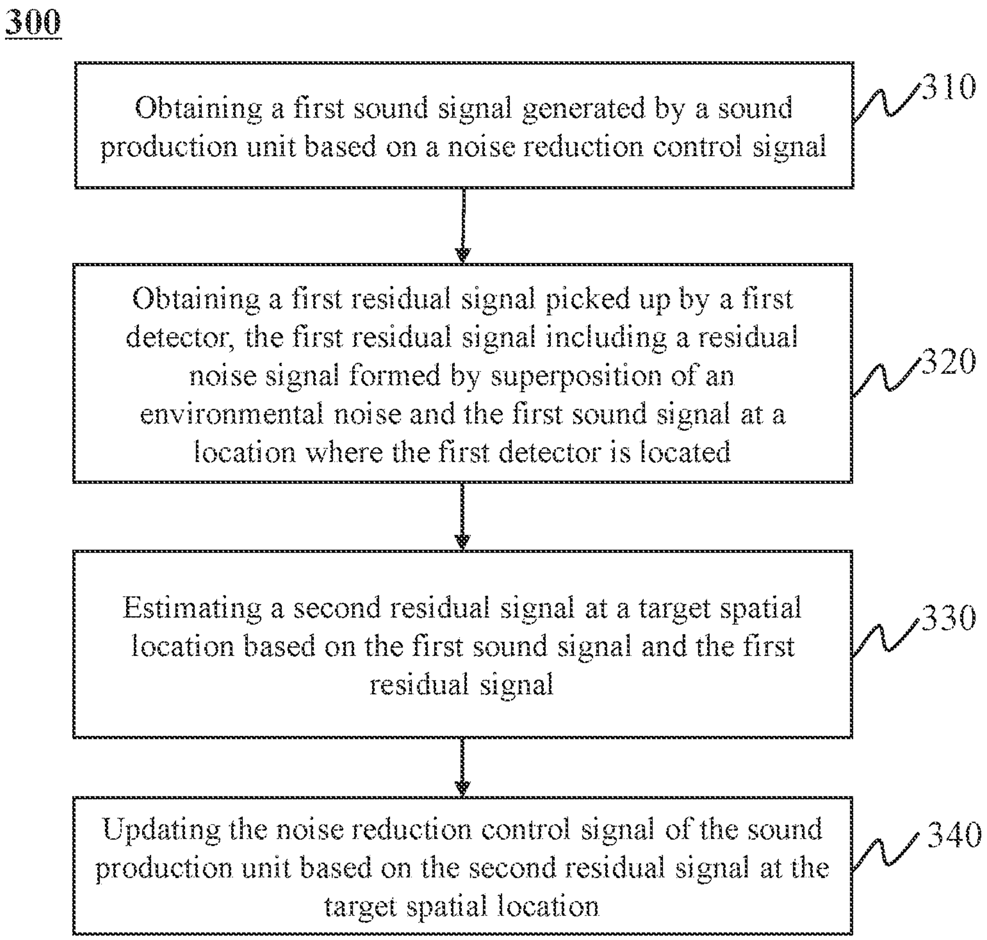
FIG. 3 is a flowchart illustrating an exemplary process for reducing a noise of an acoustic device according to some embodiments of the present disclosure.

FIG. 3 is a flowchart illustrating an exemplary process for reducing a noise of an acoustic device according to some embodiments of the present disclosure. In some embodiments, a process 300 may be performed by the acoustic device 100.

In step 310, a processor may obtain a first sound signal generated by the sound production unit 110 based on a noise reduction control signal. In some embodiments, the step 310 may be performed by the processor 130.

In some embodiments, the noise reduction control signal may be generated based on an environmental noise picked up by a third detector (i.e., a feedforward microphone). The processor 130 may generate a noise reduction electrical signal (which comprises information in the first sound signal) based on the environmental noise picked up by the third detector, and generate the noise reduction control signal based on the noise reduction electrical signal. Further, the processor 130 may transmit the noise reduction control signal to the sound production unit 110 to cause the sound production unit 110 to generate the first sound signal. It is to be understood that the processor 130 obtaining the first sound signal may be understood as the processor 130 obtaining the noise reduction electrical signal. The noise reduction electrical signal and the first sound signal are only different in presentation, with the former being an electrical signal and the latter being a vibration signal. In some embodiments, the sound production unit 110 may also generate an updated first sound signal based on an updated noise reduction control signal.

In step 320, the processor may obtain a first residual signal picked up by the first detector 120. The first residual signal may include a residual noise signal formed by the superposition of the environmental noise and the first sound signal at a location where the first detector 120 is located. In some embodiments, the step 320 may be performed by the processor 130.

According to related description in FIG. 1, the environmental noise may refer to a combination of a variety of external sounds (e.g., a traffic noise, an industrial noise, a construction noise, a social noise) in an environment in which a user is located. In some embodiments, the first detector 120 may be disposed at a location proximate to the user's ear canal for picking up the first residual signal delivered to the user at the user's ear canal. Further, the first detector 120 may convert the picked-up first residual signal into an electrical signal and transmit the electrical signal to the processor 130 for processing.

In step 330, the processor may estimate a second residual signal at a target spatial location based on the first sound signal and the first residual noise. In some embodiments, the step 330 may be performed by the processor 130.

The second residual signal may include a residual noise signal formed by the superposition of the environmental noise and the first sound signal at the target spatial location. It is to be appreciated that since the acoustic device 100 is an open acoustic device, the environment in which the first detector 120 (i.e., a feedback microphone) and the target spatial location (e.g., at the tympanic membrane) are located is no longer a pressure field environment. Therefore, a noise signal received by the first detector 120 no longer directly reflects a noise signal at the target spatial location. Accordingly, the processor 130 may determine the second residual signal based on at least one transfer function among the sound production unit 110, the first detector 120, an environmental noise source, and the target spatial location. In some embodiments, the transfer function between any two of the sound production unit 110, the first detector 120, the environmental noise source, and the target spatial location may characterize a relationship between sound signals at the corresponding locations of the two; the relationship may reflect, for example, a transmission quality during transmission of a sound signal generated by one of the two to the other of the two, or a relationship between a sound signal obtained by one of the two and a sound signal generated by the other of the two. For example, a transfer function between the sound production unit 110 and the first detector 120 may characterize transmission quality during transmission of the first sound signal generated by the sound production unit 110 to the first detector 120 or a relationship between the first residual signal obtained by the first detector 120 and the first sound signal generated by the sound production unit 110. As another example, a transfer function between the environmental noise source and the first detector 120 may characterize transmission quality during transmission from the environmental noise source to the first detector 120 or a relationship between the first residual signal obtained by the first detector 120 and the first sound signal generated by the sound production unit 110.

In some embodiments, the first sound signal (also referred to as a noise reduction signal) generated by the sound production unit 110 may be S, and the environmental noise may be N. At this point, a signal M (i.e., the first residual signal) at the first detector 120 and a signal D (i.e., the second residual signal) at the target spatial location may be expressed as following equation (1) and equation (2), respectively:

$$M=H_{SM}S+H_{NM}N, \quad (1)$$

$$D=H_{SD}S+H_{ND}N, \quad (2)$$

where, $H_{SM}$ denotes a first transfer function between the sound production unit 110 and the first detector 120, $H_{SD}$ denotes a second transfer function between the sound production unit 110 and the target spatial location, $H_{NM}$ denotes a third transfer function between the environmental noise source and the first detector 120, $H_{ND}$ denotes a fourth transfer function between the environmental noise source and the target spatial location.

In order to achieve a goal of active noise reduction, it is necessary to estimate the second residual signal D at the target spatial location. The second residual signal D at the target spatial location may be considered as the magnitude of a noise that the user hears after the active noise reduction (e.g., what the user's tympanic membrane may pick up). At this point, equations (1) and (2) above may be simplified to the following equation (3):

$$D = H_{SD}S + H_{ND}N = \frac{H_{ND}}{H_{NM}}M + \left(H_{SD} - \frac{H_{ND}}{H_{NM}}H_{SM}\right)S. \quad (3)$$

In some embodiments, the processor 130 may directly obtain the first transfer function $H_{SM}$ between the sound production unit 110 and the first detector 120, the second transfer function $H_{SD}$ between the sound production unit 110 and the target spatial location, the third transfer function $H_{NM}$ between the environmental noise source and the first detector 120, and the fourth transfer function $H_{ND}$ between the environmental noise source and the target spatial location. Furthermore, the processor 130 may estimate the second residual signal D at the target spatial location based on the first transfer function, the second transfer function, the third transfer function, the fourth transfer function, the first sound signal S, and the first residual signal M according to equation (3). In some embodiments, the first transfer function, the second transfer function, the third transfer function, and the fourth transfer function may be correlated with a user category. The processor 130 may call a corresponding first transfer function, a corresponding second transfer function, a corresponding third transfer function, and a corresponding fourth transfer function directly from the memory 150 based on a current user category (e.g., adult or child).

In some embodiments, the first transfer function, the second transfer function, the third transfer function, and the fourth transfer function may be related to a wearing posture of the acoustic device 100. The processor 130 may call a first transfer function, a second transfer function, a third transfer function, and a fourth transfer function corresponding to a current wearing posture directly from the memory 150. For example, the acoustic device 100 may include one or more sensors, e.g., a distance sensor, a location sensor, etc. The sensor may detect a distance from the acoustic device 100 to the user's ear and/or a location of the acoustic device 100 relative to the user's ear. Different wearing postures of the acoustic device 100 may correspond to different distances from the acoustic device 100 to the user's ear and/or different relative locations of the acoustic device 100 to the user's ear. The processor 130 may determine a current wearing posture of the acoustic device 100 based on distance data and/or location data obtained by the sensor(s), thereby further determining the first transfer function, the second transfer function, the third transfer function, and the fourth transfer function corresponding to the current wearing posture.

In some embodiments, the processor 130 may directly determine, based on sensing data of the sensor (e.g., a relative positional relationship, a distance relationship, etc., between the acoustic device 100 and the user's ear), the first transfer function, the second transfer function, the third transfer function, and the fourth transfer function corresponding to the acoustic device 100. Specifically, different distances from the acoustic device 100 to the user's ear and/or different relative positional relationships between the acoustic device 100 and the user's ear may correspond to different first transfer functions, different second transfer functions, different third transfer functions, and different fourth transfer functions. The processor 130 may directly invoke a first transfer function, a second transfer function, a third transfer function, and a fourth transfer function corresponding to distance data and/or location data obtained by the sensor.

In some embodiments, a mapping relationship may exist between the first transfer function and the second transfer function, the third transfer function, or the fourth transfer function, respectively. The processor 130 may obtain the first transfer function and, based on the mapping relationship between the first transfer function and the second transfer function, the third transfer function, or the fourth transfer function, determine the second transfer function, the third transfer function, and the fourth transfer function, respectively, then further determine the second residual signal D at the target spatial location. In some embodiments, the mapping relationship among the first transfer function, the second transfer function, the third transfer function, and the fourth transfer function may be determined by a trained neural network. Specifically, the processor 130 may determine the first transfer function between the sound production unit 110 and the first detector 120 based on a relationship between the first sound signal (or the noise control signal used to generate the first sound signal) and the first residual signal. For example, when the user wears the acoustic device 100 in a scenario in which no noise exists, the first transfer function may be determined according to the following equation (4):

$$H_{SM} = \frac{M}{S}. \quad (4)$$

Further, the processor 130 may input the first transfer function into the trained neural network and obtain outputs of the trained neural network to determine the second transfer function, the third transfer function, and/or the fourth transfer function.

In some embodiments, the mapping relationship between the first transfer function and the second transfer function, the third transfer function, or the fourth transfer function, respectively, may be generated based on test data of the acoustic device 100 in different wearing scenarios (or different wearing postures) and be stored in the memory 150. The processor 130 may be directly called up for use. It will be appreciated that the acoustic device 100 may correspond to different first transfer functions, different second transfer functions, different third transfer functions, and different fourth transfer functions in different wearing scenarios or usage states. In addition, the first transfer function may have a different mapping relationship with the second transfer function, the third transfer function, or the fourth transfer function. The mapping relationship may be changed with, for example, a change in the wearing scenario (or wearing posture). Further details on the mapping relationship among the first transfer function, the second transfer function, the third transfer function, and the fourth transfer function may be referred to FIG. 4 and its related description, which will not be described herein.

In some embodiments, the processor 130 may determine relationships among the second residual signal, the first transfer function, the first sound signal, and the first residual signal based on the mapping relationship between the first transfer function and the second transfer function, the third transfer function, or the fourth transfer function, respectively. In other words, the second residual signal may be considered as a function with the first transfer function as a variable. When the first transfer function is determined, the processor 130 may estimate the second residual signal at the target spatial location based on the function, the first sound signal generated by the sound production unit 110, and the first residual signal received by the first detector 120.

In some embodiments, according to equation (3), a ratio of the third transfer function $H_{NM}$ to the fourth transfer function $H_{ND}$ may be viewed as a whole (which may also be referred to as a fifth transfer function) for reflecting a relationship among the environmental noise source, the first detector, and the target spatial location. In other words, instead of obtaining the third transfer function $H_{ND}$ and the fourth transfer function $H_{NM}$ individually, the processor 130 may simply obtain the ratio of the third transfer function $H_{ND}$ to the fourth transfer function $H_{NM}$. Specifically, the processor 130 may obtain the first transfer function between the sound production unit 110 and the first detector 120, the second transfer function between the sound production unit 110 and the target spatial location, and the fifth transfer function $$\left(\text{i.e., } \frac{H_{ND}}{H_{NM}}\right)$$

reflecting the relationships among the environmental noise source, the first detector 120, and the target spatial location. The processor 130 may estimate the second residual signal D at the target spatial location based on the first transfer function, the second transfer function, the fifth transfer function, the first sound signal, and the first residual signal according to equation (3).

In some embodiments, the second transfer function may have a first mapping relationship with the first transfer function, and the fifth transfer function may have a second mapping relationship with the first transfer function. After determining the first transfer function, the processor 130 may determine the second transfer function based on the first transfer function and the first mapping relationship between the first transfer function and the second transfer function, and determine the fifth transfer function (i.e., the ratio of the fourth transfer function to the third transfer function) based on the second mapping relationship between a ratio of the fourth transfer function to the third transfer function and the first transfer function. More description of the first mapping relationship and the second mapping relationship may be found in FIG. 4 and its description, which will not be repeated here.

In some embodiments, the acoustic device 100 may also include an adjustment button or may be adjusted via an application program (APP) on a user terminal. Through the adjustment button or the APP on the user terminal, the user may select a transfer function or a mapping relationship between transfer functions associated with the acoustic device 100 that the user needs. For example, the user may select the distance from the acoustic device 100 to the user's ear (or face) (i.e., adjust the wearing posture) by means of the adjustment button or the APP on the user terminal. The processor 130 may obtain a corresponding first transfer function, a corresponding second transfer function, a corresponding third transfer function, and a corresponding fourth transfer function, or a mapping relationship among the first transfer function, the second transfer function, the third transfer function, and/or the fourth transfer function according to the distance from the acoustic device 100 to the user's ear (or face). Further, the processor 130 may estimate the second residual signal D at the target spatial location based on the obtained transfer function, the obtained mapping relationship between the transfer functions, the first sound signal S of the sound production unit 110, and the first residual signal M detected by the first detector 120. In other words, the user may adjust the active noise reduction performance of the acoustic device 100 via the adjustment button or the APP on the user terminal, for example, a complete noise reduction or a partial noise reduction.

In step 340, the processor may update the noise control signal of the sound production unit 110 based on the second residual signal at the target spatial location. In some embodiments, the step 340 may be performed by the processor 130.

In some embodiments, the processor 130 may generate a corresponding new noise reduction electrical signal based on the second residual signal D estimated in the step 330, and generate a new noise reduction control signal based on the new noise reduction electrical signal. Alternatively, the processor 130 may update the noise reduction control signal for controlling a sound generated by the sound production unit 110. Specifically, in some embodiments, when it is desired to achieve the complete active noise reduction, the second residual signal at the target spatial location may be considered to be essentially 0, i.e., the acoustic unit 100 is essentially capable of eliminating the external noise so that the user may not hear the external noise, henceforth realizing the good active noise reduction effect. At this time, the first sound signal S generated by the sound production unit 110 may be simplified as follows:

$$S = \frac{\frac{H_{ND}}{H_{NM}}}{\left(\frac{H_{ND}}{H_{NM}} H_{SM} - H_{SD}\right)} M. \tag{5}$$

In other words, the processor 130 may calculate the magnitude of the noise reduction signal required to be generated by the sound production unit 110 based on the first transfer function $H_{SM}$ between the sound production unit 110 and the first detector 120, the second transfer function $H_{SD}$ between the sound production unit 110 and the target spatial location, the third transfer function $H_{NM}$ between the environmental noise source and the first detector 120, the fourth transfer function $H_{ND}$ between the environmental noise source and the target spatial location, and the first residual signal M at the first detector 120, so as to correct an existing noise reduction signal generated by the sound production unit 110, henceforth realizing a real-time correction of the noise reduction signal of the sound production unit 110 and ensuring that the noise reduction signal generated by the sound production unit 110 can realize a good active noise reduction effect.

It should be noted that the foregoing description of the process 300 is intended to be exemplary and illustrative only and does not limit the scope of application of the present disclosure. For a person skilled in the art, various corrections and changes can be made to the process 300 under the guidance of the present disclosure. These corrections and changes remain within the scope of the present disclosure. For example, in some embodiments, the acoustic device 100 may be a closed acoustic device, i.e., the first detector 120 and the target spatial location are located in a pressure acoustic field. At this point, $H_{NM}=H_{ND}$, and $H_{SD}=H_{SM}$. Thus, according to equation (3), the signal M (i.e., the first residual signal) at the first detector 120 is the same as the signal D (i.e., the second residual signal) at the target spatial location. The noise reduction signal S (i.e., the first sound signal) generated by the sound production unit 110 may satisfy the following relationship:

$$S = \frac{M - H_{NM}N}{H_{SM}}. \tag{6}$$

At this time, the processor 130 may estimate the noise reduction signal that needs to be generated by the sound production unit 110 based on the first transfer function $H_{SM}$ between the sound production unit 110 and the first detector 120, the third transfer function $H_{NM}$ between the environmental noise source and the first detector 120, the signal M obtained at the first detector 120, and the environmental noise signal N, so as to correct the existing noise reduction signal generated by the sound production unit 110, thereby realizing the real-time correction of the noise reduction signal and achieving the good active noise reduction effect.

In some embodiments, when the acoustic device 100 is a closed acoustic device and the complete active noise reduction needs to be realized, the second residual signal at the target spatial location and the first residual signal M at the first detector 120 may be considered to be essentially 0. At this time, the noise reduction signal S (i.e., the first sound signal) generated by the sound production unit 110 may satisfy the following relationship:

$$S = \frac{-H_{NM}N}{H_{SM}}. \tag{7}$$

At this point, the external noise may be completely eliminated by the noise reduction signal generated by the sound production unit 110. The processor 130 may estimate the magnitude of the noise reduction signal required to be generated by the sound production unit 110 based on the first transfer function $H_{SM}$ between the sound production unit 110 and the first detector 120, the third transfer function $H_{NM}$ between the environmental noise source and the first detector 120, the environmental noise signal N, so as to correct the existing noise reduction signal generated by the sound production unit 110, henceforth realizing the real-time correction of the noise reduction signal generated by the sound production unit 110 and ensuring that the noise reduction signal generated by the sound production unit 110 can realize the good active noise reduction effect.

It should be noted that the foregoing description of the process 300 is intended to be exemplary and illustrative only and does not limit the scope of application of the present disclosure. For a person skilled in the art, various corrections and changes may be made to the process 300 under the guidance of the present disclosure. These corrections and changes remain within the scope of the present disclosure. In some embodiments, the process 300 may be stored in a computer-readable storage medium in the form of computer instructions. The above method for reducing a noise can be implemented when the computer instructions are executed.

Figure 4:
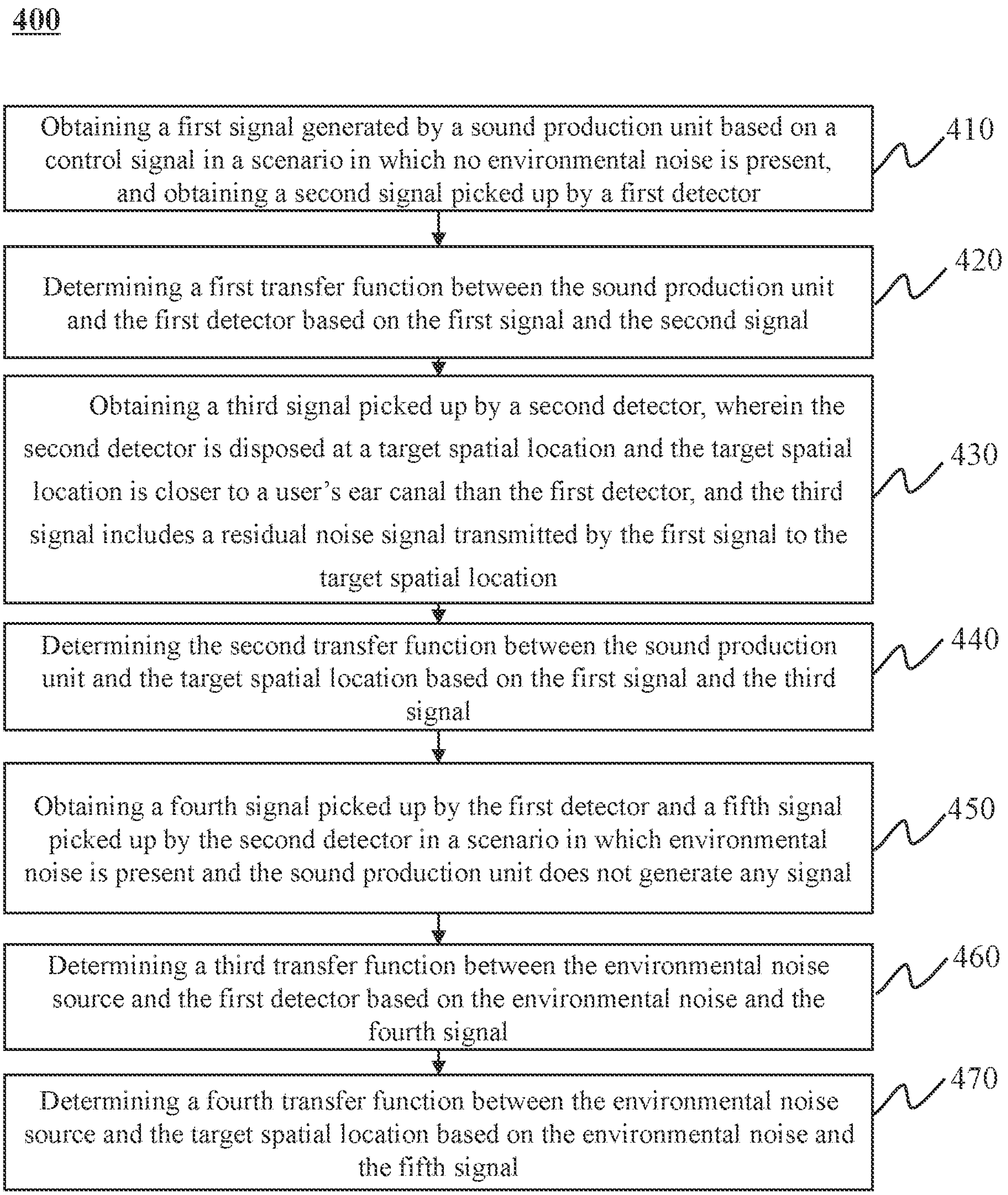
FIG. 4 is a flowchart illustrating an exemplary process for determining a transfer function of an acoustic device according to some embodiments of the present disclosure.

FIG. 4 is a flowchart illustrating an exemplary process for determining a transfer function of an acoustic device according to some embodiments of the present disclosure. In some embodiments, the acoustic device may at least include a sound production unit, a first detector, a processor, and a fixing structure. When the acoustic device is worn by a user, the fixing structure may place the acoustic device at a location near the user's ear but not blocking the user's ear canal, and a target spatial location (e.g., at a tympanic membrane or basement membrane of the user) is closer to the user's ear canal compared to the first detector. Further details regarding the sound production unit, the first detector, the processor, the target spatial location, or the like can be found by referring to the relevant description of the acoustic device 100 in FIG. 1, and will not be repeated here. In some embodiments, steps in a process 400 may be invoked and/or performed by the processor 130 in the acoustic device 100, or by a processing device other than the processor 130.

In step 410, the processor 130 may obtain a first signal generated by the sound production unit based on a control signal in a scenario in which no environmental noise is present, and obtain a second signal picked up by the first detector.

Specifically, the processor 130 may input the control signal into the sound production unit 110 after a tester wears the acoustic device 100. In response to receiving the control signal, the sound production unit 110 may output the first signal $S_0$. Further, the first signal $S_0$ output by the sound production unit 110 may be transmitted to and picked up by the first detector 120. It is to be appreciated that, due to an energy loss exists during a transmission process of the first signal, reflections exist between the signal and the tester and/or the acoustic device 100, and noises exist in the environment, etc., a signal $M_0$ picked up by the first detector 120 (e.g., a second signal) may not be the same as the first signal $S_0$. In addition, for different testers, the body tissue morphology may be different (e.g., different head sizes, different compositions of body tissues such as muscular tissues, fatty tissues, bones, etc.), henceforth resulting in different wearing postures of the acoustic device (e.g., different wearing positions, different contact forces with the tester). In some embodiments, a wearing posture (e.g., wearing location) when wearing the acoustic device 100 may also be different for the same tester. For different wearing postures, while transmitting a signal generated by the sound production unit 110 to the first detector 120, although a relative location between the sound production unit 110 and the first detector 120 is not changed, however, due to the different wearing postures of the tester, a change in a transmission condition of the signal generated by the sound production unit 110 during transmission still happens (e.g., different reflections of the signal). As a result, the first transfer function between the sound production unit 110 of the acoustic device 100 and the first detector 120 may also be different for different wearing postures.

In some embodiments, the tester may be a simulated human head in a laboratory or a user. For example, when the acoustic device 100 is worn on the simulated human head, the first detector 120 of the acoustic device 100 and the sound production unit 110 may be located near an ear canal of the simulated human head. In some embodiments, the control signal may be an electrical signal comprising any sound signal. It is to be understood that in the present disclosure, the sound signal (e.g., the first signal, the second signal, etc.) may include parametric information such as frequency information, amplitude information, phase information, etc. In some embodiments, the first signal and/or the second signal may refer to a sound signal or an electrical signal obtained after converting the sound signal.

In step 420, the processor 130 may determine a first transfer function between the sound production unit 110 and the first detector 120 based on the first signal and the second signal.

It will be appreciated that in a scenario where no environmental noise is present, all second signals $M_0$ detected by the first detector 120 are transmitted from the sound production unit 110. The ratio of the second signal $M_0$ picked up by the first detector 120 and the first signal $S_0$ generated by the sound production unit 110 may directly reflect the transmission quality or transmission efficiency of the first signal generated by the sound production unit 110 transmitted from the sound production unit 110 to the first detector 120. In some embodiments, the first transfer function $H_{SM}$ is positively correlated with a ratio of the second signal $M_0$ to the first signal $S_0$. Merely by way of example, a relationship among the first transfer function $H_{SM}$, the first signal $S_0$, and the second signal $M_0$ may satisfy:

$$H_{SM} = \frac{M_0}{S_0}. \tag{8}$$

In step 430, the processor 130 may obtain a third signal picked up by a second detector. The second detector may be disposed at the target spatial location to mimic a tympanic membrane of human (or a base membrane) picking up the sound signal. The target spatial location is closer to the tester's ear canal than the first detector 120. In some embodiments, the target spatial location may be at a location where the tester's ear canal, the tympanic membrane, or the base membrane is located. For example, when the sound production unit 110 is an air-conducting speaker, the target spatial location may be at or near a location of the tympanic membrane of the tester. When the sound production unit 110 is a bone-conducting speaker, the target spatial location may be at or near a location of the tester's base membrane. In some embodiments, the second detector may be a miniature microphone (e.g., a MEMS microphone), which may enter the user's ear canal and perform sound obtaining inside the ear canal.

Specifically, the first signal $S_0$ output by the sound production unit 110 may be delivered to the target spatial location and picked up by the second detector at the target spatial location. Similar to the first signal being transmitted to the first detector 120, due to an energy loss exists during a transmission process of the first signal, reflections exist between the signal and the tester and/or the acoustic device 100, and noises exist in the environment, etc., a signal $D_0$ picked up by the second detector (e.g., the third signal) may not be the same as the first signal $S_0$. In addition, a second transfer function between the sound production unit 110 of the acoustic device 100 and the target spatial location (or the second detector) may be different in different wearing postures.

In step 440, the processor 130 may determine the second transfer function between the sound production unit 110 and the target spatial location based on the first signal and the third signal.

It will be appreciated that in a scenario where no environmental noise is present, all third signals $D_0$ detected by the second detector are transmitted from the sound production unit 110. A ratio of the third signal $D_0$ picked up by the second detector to the first signal $S_0$ output by the sound production unit 110 may directly reflect the transmission quality or transmission efficiency of the first signal generated by the sound production unit 110 during a transmission process from the sound production unit 110 to the second detector (i.e., the target spatial location). In some embodiments, the second transfer function $H_{SD}$ may be positively correlated with a ratio of the third signal $D_0$ to the first signal $S_0$. Merely by way of example, a relationship among the second transfer function $H_{SD}$, the first signal $S_0$, and the third signal $D_0$ may satisfy:

$$H_{SD} = \frac{D_0}{s_0}. \tag{9}$$

In step 450, the processor 130 may obtain a fourth signal picked up by the first detector 120 and a fifth signal picked up by the second detector in a scenario in which environmental noise is present and the sound production unit 110 does not generate any signal. The environmental noise may be generated by one or more environmental noise sources. The environmental noise source(s) may be any sound source other than the sound production unit during testing. For example, the environmental noise may be obtained by simulating other sound production units in a test environment.

Specifically, the environmental noise generated by the environmental noise source may be transmitted to and picked up by the first detector 120 and the second detector, respectively. Similar to the first signal being transmitted to the first detector 120, due to an energy loss exists during a transmission process of the environmental noise, reflections exist between the signal and the tester (or acoustic device), etc., a signal $M'_0$ picked up by the first detector 120 (i.e., the fourth signal) and a signal $D'_0$ picked up by the second detector (i.e., the fifth signal) may not be the same as the environmental noise signal. In addition, in different wearing postures, a third transfer function between the environmental noise source and the first detector 120 may be different, and a fourth transfer function between the environmental noise source and the target spatial location (or the second detector) may be different.

In step 460, the processor 130 may determine the third transfer function between the environmental noise source and the first detector 120 based on the environmental noise and the fourth signal.

It will be appreciated that in a scenario in which the environmental noise is present and the sound production unit 110 does not generate any signal, all fourth signals $M'_0$ detected by the first detector 120 are transmitted from the environmental noise source. A ratio of the fourth signal $M'_0$ picked up by the first detector 120 to an environmental noise $N_0$ generated by the environmental noise source may directly reflect the transmission quality or transmission efficiency of the environmental noise generated by the environmental noise source during a transmission process from the environmental noise source to the first detector 120. In some embodiments, the third transfer function $H_{NM}$ may be positively correlated with a ratio of the fourth signal $M'_0$ to the environmental noise $N_0$. Merely by way of example, a relationship among the third transfer function $H_{NM}$, the environmental noise $N_0$, and the fourth signal $M'_0$ may satisfy:

$$H_{NM} = \frac{M'_0}{N_0}. \tag{10}$$

In step 470, the processor 130 may determine the fourth transfer function between the environmental noise source and the target spatial location based on the environmental noise and the fifth signal.

It will be appreciated that in a scenario in which the environmental noise is present and the sound production unit does not generate any signal, all fifth signals $D'_0$ detected by the second detector are transmitted from the environmental noise source. A ratio of the fifth signal $D'_0$ picked up by the second detector to the environmental noise $N_0$ generated by the environmental noise source may directly reflect the transmission quality or transmission efficiency of the environmental noise generated by the environmental noise source during a transmission process from the environmental noise source to the second detector (i.e., the target spatial location). In some embodiments, the fourth transfer function $H_{ND}$ may be positively correlated with a ratio of the fifth signal $D'_0$ to the environmental noise $N_0$. Merely by way of example, a relationship among the fourth transfer function $H_{ND}$, the environmental noise $N_0$, and the fifth signal $D'_0$ may satisfy:

$$H_{ND} = \frac{D'_0}{N_0}. \tag{11}$$

In some embodiments, the first transfer function, the second transfer function, the third transfer function, and the fourth transfer function measured for a certain tester category (e.g., adults, children) may be stored into the memory 150. While the user is wearing the acoustic device 100, the processor 130 may directly call a first transfer function, a second transfer function, a third transfer function, and a fourth transfer function measured for a particular typical tester to roughly estimate a second residual signal at a target spatial location (e.g., at a tympanic membrane of the user), thereby roughly estimating the noise reduction signal of the sound production unit and realizing the active noise reduction. For example, a set of first transfer functions, second transfer functions, third transfer functions, and fourth transfer functions may correspond to adult male. Another set of first transfer functions, second transfer functions, third transfer functions, and fourth transfer functions may correspond to children. When the user is a child, the processor 130 may call the set of first transfer functions, the second transfer functions, the third transfer functions, and the fourth transfer functions corresponding to the children.

In some embodiments, for different wearing scenarios (e.g., different wearing locations) or different testers, the processor 130 may repeat steps 410-470 to determine a plurality of sets of transfer functions of the acoustic device 100 in different wearing postures, and store the plurality of sets of transfer functions corresponding to the different wearing postures in the memory 150 for recall. Each set of transfer functions may include a corresponding first transfer function, a second transfer function, a third transfer function, and a fourth transfer function. When the user is wearing the acoustic device 100, the processor 130 may call the first transfer function, the second transfer function, the third transfer function, and the fourth transfer function corresponding to the wearing posture based on the wearing posture of the acoustic device 100. Further, the processor 130 may estimate the second residual signal at the target spatial location based on the called transfer functions, the first sound signal of the sound production unit 110, and the first residual signal picked up by the first detector 120, and update a noise reduction control signal for controlling the sound production of the sound production unit 110 based on the second residual signal. More description of determining the second residual signal based on the transfer functions can be found in FIG. 3 and its description, and will not be repeated here.

In some embodiments, since the transfer function varies according to the wearing postures of the acoustic device 100, when the user wears the acoustic device 100, the processor 130 may directly determine the first transfer function based on the first sound signal output by the sound production unit 110 and the first residual signal detected by the detector 120, but may not directly obtain the second transfer function, the third transfer function, and the fourth transfer function. In this case, the processor 130 may determine the second transfer function, the third transfer function, and the fourth transfer function, respectively, based on relationships among the first transfer function, the second transfer function, the third transfer function, and the fourth transfer function, respectively. Specifically, the processor 130 may determine a relationship between the first transfer function and the second transfer function, a relationship between the first transfer function and the third transfer function, and a relationship between the first transfer function and the fourth transfer function, respectively, based on a plurality of sets of transfer functions corresponding to different wearing postures, and store the relationships in the memory 150 for retrieval. In some embodiments, the processor 130 may statistically determine the relationships among the first transfer function, the second transfer function, the third transfer function, and the fourth transfer function, respectively. In some embodiments, the processor 130 may train a neural network by using a plurality of sets of sample transfer functions as training samples. Each set of sample transfer functions may be actually measured by the acoustic device 100 in different wearing states based on test signals. The processor 130 may relate a trained neural network as the relationships among the first transfer function, the second transfer function, the third transfer function, and the fourth transfer function, respectively. For example, for the relationship between the first transfer function and the second transfer function, the processor 130 may take a first sample transfer function in each set of sample transfer functions as an input of a first neural network, and a second sample transfer function in the set of sample transfer functions as an output of the first neural network to train the first neural network. The processor 130 may use the trained first neural network as the relationship between the first transfer function and the second transfer function. Specifically, in the application, the processor 130 may input the first transfer function into the trained first neural network to determine the second transfer function.

In some embodiments, the ratio of the third transfer function $H_{NM}$ to the fourth transfer function $H_{ND}$ may be viewed as a whole according to equation (3), in which case the second residual signal may be determined without obtaining the third transfer function $H_{NM}$ and the fourth transfer function $H_{ND}$ separately. In this case, the processor 130 may determine a first mapping relationship between the first transfer function $H_{SM}$ and the second transfer function $H_{SD}$ based on the plurality of sets of transfer functions corresponding to different wearing postures, and a second mapping relationship between the ratio of the third transfer function $H_{NM}$ to the fourth transfer function $H_{ND}$ and the first transfer function $H_{SM}$. The processor 130 may store the first mapping relationship and the second mapping relationship in the memory 150 for call. Exemplarily, the first mapping relationship and the second mapping relationship may be represented as, respectively:

$$H_{SD} = g(H_{SM}). \tag{12}$$

$$\frac{H_{ND}}{H_{NM}} = f(H_{SM}). \tag{13}$$

When the user is wearing the acoustic device 100, the processor 130 may determine the second transfer function based on the first transfer function and the first mapping relationship, and determine the ratio of the fourth transfer function to the third transfer function based on the first transfer function and the second mapping relationship. Further, the processor 130 may estimate the second residual signal at the target spatial location based on the first transfer function, the second transfer function, the ratio of the fourth transfer function to the third transfer function, the first sound signal generated by the sound production unit 110, and the first residual signal detected by the first detector 120, and update the noise control signal based on the second residual signal at the target spatial location. The sound production unit 110 generates a new first sound signal (i.e., the noise reduction signal) in response to the updated noise control signal.

In some embodiments, the processor 130 may use the plurality of sets of sample transfer functions as training samples to train a neural network to obtain a trained neural network, and use the trained neural network as the second mapping relationship. Specifically, the processor 130 may use a first sample transfer function in each set of sample transfer functions as an input of a second neural network, and a ratio of a fourth sample transfer function to a sample third transfer function in the set of sample transfer functions as an output of the second neural network to train the second neural network. The processor 130 may use the trained second neural network as the second mapping relationship. In application, the processor 130 may input the first transfer function into the trained second neural network to determine the ratio of the fourth transfer function to the third transfer function.

In some embodiments, the acoustic device 100 may include one or more sensors (also referred to as a fourth detector). For example, a distance sensor, a location sensor, etc. The sensors may detect a distance from the acoustic device 100 to the user's ear (or face) and/or a relative location of the acoustic device 100 to the user's ear. For ease of description, the present disclosure will describe the distance sensor as an example. In some embodiments, different wearing postures may correspond to different distances from the acoustic device 100 to the user's ear (or face). The processor 130 may store a first transfer function, a second transfer function, a third transfer function, and a fourth transfer function corresponding to different distances in the memory 150 for retrieval. In some embodiments, the processor 130 may store different wearing postures of the acoustic device 100 and distances and transfer functions corresponding to the different wearing postures in the memory 150. While the user is wearing the acoustic device 100, the processor 130 may first determine a wearing posture of the acoustic device 100 based on a distance from the acoustic device 100 to the user's ear detected by the distance sensor. The processor 130 may further determine the first transfer function, the second transfer function, the third transfer function, and the fourth transfer function based on the wearing posture. Alternatively, the processor 130 may directly determine the first transfer function, the second transfer function, the third transfer function, and the fourth transfer function based on the distance from the acoustic device 100 to the user's ear detected by the distance sensor (i.e., the fourth detector). In some embodiments, the processor 130 may determine mapping relationships among the first transfer function, the second transfer function, the third transfer function, and the fourth transfer function based on the distance from the acoustic device 100 to the user's ear detected by the distance sensor.

In some embodiments, the processor 130 may use distance data obtained by the distance sensor (or the distance data along with the first transfer function) as an input of a trained third neural network to obtain the second transfer function, the third transfer function, and/or the fourth transfer function. Specifically, the processor 130 may use a sample distance obtained by the distance sensor (or the sample distance along with a first sample transfer function in a corresponding set of sample transfer functions) as an input of a third neural network, and use a sample second transfer function, a sample third transfer function, and/or a sample fourth transfer function in the set of sample transfer functions as an output of the third neural network to train the third neural network. In application, the processor 130 may input the distance data obtained by the distance sensor (or the distance data along with the first transfer function) into a trained third neural network to determine the second transfer function, the third transfer function and/or the fourth transfer function.

It should be noted that the foregoing description of the process 400 is intended to be exemplary and illustrative only and does not limit the scope of application of the present disclosure. For a person skilled in the art, various corrections and changes may be made to the process 400 under the guidance of the present disclosure. These corrections and changes remain within the scope of the present disclosure. For example, in some embodiments, during testing, the second signal may be obtained first, or the third signal may be obtained first. Alternatively, the second signal and the third signal may be obtained simultaneously. In some embodiments, the process 400 may be stored in a computer-readable storage medium in the form of computer instructions. The method of testing the transfer function described above can be implemented when this computer instruction is executed.

The basic concepts have been described above, and it is apparent to those skilled in the art that the foregoing detailed disclosure serves only as an example and does not constitute a limitation of the present disclosure. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. such as "an embodiment," "one embodiment," and/or "some embodiment" means a feature, structure, or characteristic associated with at least one embodiment of the present disclosure. Accordingly, it should be emphasized and noted that "an embodiment", or "one embodiment", or "an alternative embodiment" referred to two or more times in different locations in the present disclosure do not necessarily refer to the same embodiment. In addition, some features, structures, or features in the present disclosure of one or more embodiments may be appropriately combined.

Furthermore, it will be appreciated by those skilled in the art that aspects of the present disclosure may be illustrated and described by a number of patentable varieties or circumstances, including any new and useful process, machine, product, or combination of substances, or any of their new and useful improvements. Accordingly, all aspects of the present disclosure may be performed entirely by hardware, may be performed entirely by softwares (including firmware, resident softwares, microcode, etc.), or may be performed by a combination of hardware and softwares. The above hardware or softwares can be referred to as "data block," "module," "engine," "unit," "component" or "system." In addition, aspects of the present disclosure may appear as a computer product located in one or more computer-readable media, the product including computer-readable program code.

Computer storage media may include a propagated data signal with a computer program encoded within it, e.g., on a baseband or as part of a carrier. The propagation signal may have a variety of manifestations, including an electromagnetic form, an optical form, and the like, or suitable combinations thereof. The computer storage medium may be any computer-readable medium, other than a computer-readable storage medium, which may be used by connecting to an instruction-executing system, device, or apparatus for communicating, propagating, or transmitting for use. Program code disposed on the computer storage medium may be disseminated via any suitable medium, including radio, cable, fiber optic cable, RF, or the like, or any combination of the foregoing.

In addition, unless expressly stated in the claims, the order of the processing elements and sequences, the use of numerical letters, or the use of other names as described herein is not intended to qualify the order of the processes and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

Numbers describing the number of components, attributes, and properties are used in some embodiments, and it is to be understood that such numbers used in the description of embodiments are modified in some examples by the modifiers "about," "approximately," or "substantially". Unless otherwise noted, the terms "about," "approximate," or "roughly" indicates that a ±20% variation in the stated number is allowed. Correspondingly, in some embodiments, the numerical parameters used in the present disclosure and claims are approximations, which approximations are subject to change depending on the desired characteristics of individual embodiments. In some embodiments, the numerical parameters should take into account the specified number of valid digits and employ general place-keeping. While the numerical domains and parameters used to confirm the breadth of their ranges in some embodiments of the present application are approximations, in specific embodiments such values are set to be as precise as possible within a feasible range.

For each patent, patent application, patent application disclosure, and other material cited in the present disclosure, such as articles, books, specifications, publications, documents, or the like, the entire contents of which are hereby incorporated herein by reference. Historical application history documents that are inconsistent with or create a conflict with the contents of the present disclosure are excluded, as well as documents that limit the broadest scope of the claims of the present disclosure that are presently or hereafter appended to the present disclosure. It should be noted that to the extent that the descriptions, definitions, and/or use of terms in the materials appurtenant to the present disclosure are inconsistent with or conflict with the contents of what is stated herein, the descriptions, definitions, and/or use of terms in the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An acoustic device, comprising a sound production unit, a first detector, a processor, and a fixing structure, wherein:

the sound production unit is configured to generate a first sound signal according to a noise reduction control signal, wherein the sound production unit is a speaker;

the first detector is configured to obtain a first residual signal, the first residual signal comprising a residual noise signal formed by superimposition of an environmental noise and the first sound signal at a location where the first detector is located, wherein the first detector is a microphone;

the processor is configured to:

obtain a first transfer function between the sound production unit and the first detector, a second transfer function between the sound production unit and a target spatial location, a third transfer function between an environmental noise source and the first detector, and a fourth transfer function between the environmental noise source and the target spatial location:

estimate a second residual signal at the target spatial location based on the first transfer function, the second transfer function, the third transfer function, the fourth transfer function, the first sound signal, and the first residual signal; and update the noise reduction control signal based on the second residual signal; and the fixing structure is configured to place the acoustic device at a location near a user's ear but not blocking the user's ear canal, the target spatial location being closer to the user's ear canal than the first detector.

2. The acoustic device of claim 1, wherein the obtain a first transfer function between the sound production unit and the first detector, a second transfer function between the sound production unit and a target spatial location, a third transfer function between an environmental noise source and the first detector, and a fourth transfer function between the environmental noise source and the target spatial location includes:

obtaining the first transfer function; and determining the second transfer function, the third transfer function, and the fourth transfer function based on the first transfer function and mapping relationships between the first transfer function and the second transfer function, the third transfer function, and the fourth transfer function, respectively.

3. The acoustic device of claim 2, wherein the mapping relationships between the first transfer function and the second transfer function, the third transfer function, and the fourth transfer function, respectively, are generated based on test data of the acoustic device in different wearing scenarios.

4. The acoustic device of claim 1, wherein the obtain a first transfer function between the sound production unit and the first detector, a second transfer function between the sound production unit and a target spatial location, a third transfer function between an environmental noise source and the first detector, and a fourth transfer function between the environmental noise source and the target spatial location includes:

obtaining the first transfer function;

inputting the first transfer function into a trained neural network; and determining outputs of the trained neural network as the second transfer function, the third transfer function, and the fourth transfer function.

5. The acoustic device of claim 1, wherein the obtain the first transfer function includes:

calculating the first transfer function based on the noise reduction control signal and the first residual signal.

6. The acoustic device of claim 1, wherein the acoustic device further includes a distance sensor, the distance sensor being configured to detect a distance from the acoustic device to the user's ear; and the processor is further configured to determine the first transfer function, the second transfer function, the third transfer function, and the fourth transfer function based on the distance.

7. An acoustic device, comprising a sound production unit, a first detector, a processor, and a fixing structure, wherein:

the sound production unit is configured to generate a first sound signal according to a noise reduction control signal, wherein the sound production unit is a speaker;

the first detector is configured to obtain a first residual signal, the first residual signal comprising a residual noise signal formed by superimposition of an environmental noise and the first sound signal at a location where the first detector is located, wherein the first detector is a microphone;

the processor is configured to:

obtain a first transfer function between the sound production unit and the first detector, a second transfer function between the sound production unit and a target spatial location, and a fifth transfer function reflecting a relationship among an environmental noise source, the first detector, and the target spatial location;

estimate a second residual signal at the target spatial location based on the first transfer function, the second transfer function, the fifth transfer function, the first sound signal, and the first residual signal; and update the noise reduction control signal based on the second residual signal; and the fixing structure is configured to place the acoustic device at a location near a user's ear but not blocking the user's ear canal, the target spatial location being closer to the user's ear canal than the first detector.

8. The acoustic device of claim 7, wherein:

the first transfer function and the second transfer function have a first mapping relationship; and the fifth transfer function and the first transfer function have a second mapping relationship.

9. A method for determining a transfer function of an acoustic device, wherein the acoustic device includes a sound production unit, a first detector, a processor, and a fixing structure, and the fixing structure is configured to place the acoustic device at a location near a tester's ear but not blocking the tester's ear canal, wherein the method comprises:

obtaining, in a scenario in which no environmental noise exists, a first signal generated by the sound production unit based on a noise reduction control signal and a second signal obtained by the first detector, wherein the second signal includes a residual noise signal transmitted by the first signal to the first detector;

determining a first transfer function between the sound production unit and the first detector based on the first signal and the second signal;

obtaining a third signal obtained by a second detector, wherein the second detector is disposed at a target spatial location, the target spatial location is closer to the tester's ear canal than the first detector, and the third signal includes a residual noise signal transmitted by the first signal to the target spatial location;

determining a second transfer function between the sound production unit and the target spatial location based on the first signal and the third signal;

obtaining, in a scenario in which the environmental noise exists and the sound production unit does not generate any signal, a fourth signal obtained by the first detector and a fifth signal obtained by the second detector;

determining a third transfer function between an environmental noise source and the first detector based on the environmental noise and the fourth signal; and determining a fourth transfer function between the environmental noise source and the target spatial location based on the environmental noise and the fifth signal.

10. The method of claim 9, further comprising:

determining a plurality of sets of transfer functions for different wearing scenarios or different testers, wherein each set of transfer functions includes a corresponding first transfer function, a corresponding second transfer function, a corresponding third transfer function, and a corresponding fourth transfer function; and determining, based on the plurality of sets of transfer functions, a relationship among the first transfer function, the second transfer function, the third transfer function, and the fourth transfer function.

11. The method of claim 10, wherein the determining, based on the plurality of sets of transfer functions, a relationship among the first transfer function, the second transfer function, the third transfer function, and the fourth transfer function includes:

training a neural network by using the plurality of sets of transfer functions as training samples; and determining a trained neural network as the relationship among the first transfer function, the second transfer function, the third transfer function, and the fourth transfer function.

12. The method of claim 10, wherein the relationship among the first transfer function, the second transfer function, the third transfer function, and the fourth transfer function includes:

a first mapping relationship between the first transfer function and the second transfer function; and a second mapping relationship between a ratio of the third transfer function to the fourth transfer function and the first transfer function.

13. The method of claim 10, wherein the determining, based on the plurality of sets of transfer functions, a relationship among the first transfer function, the second transfer function, the third transfer function, and the fourth transfer function includes:

obtaining a distance from the acoustic device to the corresponding tester's ear for the different wearing scenarios or different testers; and determining, based on the distance and the plurality of sets of transfer functions, the relationship among the first transfer function, the second transfer function, the third transfer function, and the fourth transfer function.

14. The method of claim 9, wherein:

the first transfer function is positively correlated with a ratio of the second signal to the first signal;

the second transfer function is positively correlated with a ratio of the third signal to the first signal;

the third transfer function is positively correlated with a ratio of the fourth signal to the environmental noise; and the fourth transfer function is positively correlated with a ratio of the fifth signal to the environmental noise.

15. The method of claim 9, wherein the target spatial location is a location where the user's tympanic membrane is located.

* * * * *